United States Patent [19]

Sasayama et al.

[11] Patent Number: 5,506,712

[45] Date of Patent: Apr. 9, 1996

[54] PHOTONIC FREQUENCY ROUTING TYPE TIME DIVISION HIGHWAY SWITCH

[75] Inventors: Koji Sasayama; Kenichi Yukimatsu, both of Saitamaken; Keishi Habara, Tokyo; Wende Zhong, Tokyo; Masato Tsukada, Tokyo, all of Japan

[73] Assignee: Nippon Telegraph and Telephone Corporation, Tokyo, Japan

[21] Appl. No.: 275,127

[22] Filed: Jul. 14, 1994

[30]  Foreign Application Priority Data

Jul. 14, 1993  [JP]  Japan ................................ 5-174232
Aug. 17, 1993  [JP]  Japan ................................ 5-203483

[51] Int. Cl.$^6$ .............................. H04J 14/00; H04J 14/08
[52] U.S. Cl. ..................... 359/123; 359/139; 359/135; 359/124; 370/50
[58] Field of Search ............................... 359/117, 123, 359/124, 139, 137, 135, 138, 140; 370/49.5, 50

[56]  References Cited

U.S. PATENT DOCUMENTS

| | | | |
|---|---|---|---|
| 5,018,130 | 5/1991 | Suzuki et al. ........................ | 359/124 |
| 5,194,977 | 3/1993 | Nishio ................................... | 359/128 |
| 5,274,487 | 12/1993 | Fujimoto .............................. | 359/117 |
| 5,303,077 | 4/1994 | Bottle et al. ......................... | 359/123 |
| 5,303,078 | 4/1994 | Brackett et al. .................... | 359/123 |
| 5,319,484 | 6/1994 | Jacob et al. ......................... | 359/123 |

FOREIGN PATENT DOCUMENTS 4220602  8/1992  Japan .

OTHER PUBLICATIONS

G. R. Hill, "A Wavelength Routing Approach to Optical Communications Network," IEEE Infocom '88, 1988, pp. 0354–0362.

Richard A. Thompson, "Optimizing Photonic Variable-Integer-Delay Circuits" pp. 141 to 143 from Topical Meeting on Photonic Switching, Tech*ical Digest Series, vol. 13, Mar. 18–20, 1987.

Charles A. Brackett, "Dense Wavelength Division Multiplexing Networks: Principles and Applications", pp. 948 to 963, from IEEE Journal on Selected Areas in Communications dated Aug. 1990.

Primary Examiner—Leo Boudreau
Assistant Examiner—Bhavesh Mehta
Attorney, Agent, or Firm—Banner & Allegretti, Ltd.

[57]  ABSTRACT

A photonic frequency routing type time division highway switch which requires no conflict control at the input side, and incorporates no inherent splitting loss of the optical signal power. The switch is formed by a plurality of tunable frequency convertors for allocating frequency channels to the optical signals on the input highways at each timeslot; a frequency router for connecting the optical signals outputted from the frequency convertors to its outputs according to the frequency channels allocated to the optical signals at each timeslot; and a plurality of frequency multiplexed output buffers for outputting the optical signals outputted from the frequency router to the output highways such that a plurality of optical signals with different frequency channels which are in an identical timeslot are outputted at different timeslots.

10 Claims, 21 Drawing Sheets

FIG. 4B

OUTPUT HIGHWAY k

|   | 0 | 1 | 2 | | M-2 | M-1 |
|---|---|---|---|---|---|---|
| 0 | $f_0$ | $f_1$ | $f_2$ | | $f_{M-2}$ | $f_{M-1}$ |
| 1 | $f_1$ | $f_2$ | $f_3$ | | $f_{M-1}$ | $f_0$ |
| 2 | $f_2$ | $f_3$ | $f_4$ | | $f_0$ | $f_1$ |
| | | | | $f_i$ | | |
| M-2 | $f_{M-2}$ | $f_{M-1}$ | $f_0$ | | $f_{M-4}$ | $f_{M-3}$ |
| M-1 | $f_{M-1}$ | $f_0$ | $f_1$ | | $f_{M-3}$ | $f_{M-2}$ |

INPUT HIGHWAY j $i = (j+k)$ modulo $M$

FR : FREQUENCY ROUTER
FC : FREQUENCY CONVERTOR
FS : FREQUENCY SELECTOR
FMOB : FREQUENCY MULTIPLEXED OUTPUT BUFFER

PHOTONIC FREQUENCY ROUTING TYPE TIME DIVISION HIGHWAY SWITCH

BACKGROUND OF THE INVENTION

1. Field of the Invention

The present invention relates to a time division highway switch in general, and more particularly to a photonic frequency routing type time division highway switch which can be used as a self-routing switch in a photonic ATM switching system.

2. Description of the Background Art

A conventionally known M×M photonic frequency routing type time division highway switch has a typical configuration as shown in FIG. 1, which comprises: M input highways 1-1-1 to 1-1-M connected to an input side of a M×M star coupler 1-3 through M frequency convertors 1-2-1 to 1-2-M, and M output highways 1-5-1 to 1-5-M connected to an output side of the star coupler 1-3 through M fixed filters 1-4-1 to 1-4-M.

In this configuration, each frequency convertor assigns a frequency channel corresponding to a desired output highway for time divisional optical signals at each timeslot on each input highway connected with it. The optical signals on the input highways 1-1-1 to 1-1-M are then optically coupled together by the star coupler 1-3, and the coupled optical signals are equally split among the output highways 1-5-1 to 1-5-M. Each fixed filter connected with each output highway takes out only the optical signal of the frequency channel corresponding to each output highway connected with it out of the supplied coupled optical signals and outputs it to the output highway connected with it. In this manner, the switching operation is realized in this conventional photonic frequency routing type time division highway switch by assigning the frequency channel at the frequency convertor.

Now, such a conventional photonic frequency routing type time division highway switch has been associated with the following problems.

(1) In a case it is necessary to connect two optical signals on different input highways to the same output highway simultaneously, the same frequency channel is going to be assigned to both of these optical signals. Consequently, these two optical signals are going to conflict with each other at the star coupler 1-3, i.e., a routing of more than one optical signals with the same frequency is going to be requested at the same timeslot, so that there is a need to carry out the conflict control at the input side in advance in order to reject such conflicting requests.

(2) The optical signals inputted into the star coupler 1-3 are going to be equally split and distributed among all the output highways 1-5-1 to 1-5-M connected to the star coupler 1-3. For this reason, the optical power of each input optical signal is going to be attenuated to 1/M on each output highway, where M is a total number of the output highways 1-5-1 to 1-5-M. In other words, the conventional photonic frequency routing type time division highway switch inherently incorporates the splitting loss of the optical signal power.

On the other hand, a conventionally known photonic buffer memory has a typical configuration as shown in FIG. 2, which comprises M opto-electronic convertors 2-1-1 to 2-1-M connected with M input ports I-1 to I-M, an electronic memory 2-2 formed by elements such as shift registers connected with the opto-electronic convertors 2-1-1 to 2-1-M, and an electro-optic convertor 2-3 connected with the electronic memory 2-2 and an output port O.

In this configuration, the optical packet signals inputted from the input ports I-1 to I-M are converted into electrical signals by the opto-electronic convertors 2-1-1 to 2-1-M, and stored in the electronic memory 2-2 in forms of the electrical signals. Then, the stored signals are converted into optical signals by the electro-optic convertor 2-3, and outputted to the output port O.

Now, in such a conventional photonic buffer memory, the optical packet signals must be converted into the electrical signals once, so that the bandwidth of the optical packet signals that can be handled is going to be limited by the characteristics of the convertors and the memory, and it has been difficult to handle the high speed optical signals such as the optical pulses with a pulse width in an order of pico-seconds.

SUMMARY OF THE INVENTION

It is therefore an object of the present invention to provide a photonic frequency routing type time division highway switch which requires no conflict control at the input side, and incorporates no inherent splitting loss of the optical signal power.

It is another object of the present invention to provide a multiple input photonic buffer memory suitable for the photonic frequency routing type time division highway switch of the present invention, which is capable of handling high speed time series optical packet signals with the frequency in an order of 100 Gbit/s which randomly arrive from a plurality of input ports.

According to one aspect of the present invention there is provided a photonic frequency routing type time division highway switch for switching optical signals on a plurality of time division input highways to output highways at each timeslot, comprising: a plurality of tunable frequency convertor means for allocating frequency channels to the optical signals on the input highways at each timeslot; frequency router means for connecting the optical signals outputted from the frequency convertor means to its outputs according to the frequency channels allocated to the optical signals at each timeslot; and a plurality of frequency multiplexed output buffer means for outputting the optical signals outputted from the frequency router means to the output highways such that a plurality of optical signals with different frequency channels which are in an identical timeslot are outputted at different timeslots.

According to another aspect of the present invention there is provided a photonic frequency routing type time division highway switch for switching optical signals on a plurality of time division input highways to output highways at each timeslot, comprising: a plurality of photonic frequency routing type time division highway switch modules, each module including: a plurality of tunable frequency convertor means for allocating frequency channels to the optical signals on its inputs at each timeslot; a frequency router for connecting the optical signals outputted from the frequency convertor means to its outputs according to the frequency channels allocated to the optical signals at each timeslot; and a plurality of frequency multiplexed output buffer means for outputting the optical signals outputted from the frequency router to the output highways such that a plurality of optical signals with different frequency channels which are in an identical timeslot are outputted at different timeslots; and a plurality of internal links for cross-connecting the photonic frequency routing type time division highway switch modules in multi-stages.

According to another aspect of the present invention there is provided a photonic frequency routing type time division highway switch for switching optical signals on a plurality of time division input highways to output highways at each timeslot, comprising: a first stage photonic frequency routing type time division highway switch module, including: a plurality of first stage tunable frequency convertor means for allocating frequency channels to the optical signals on the input highways at each timeslot; and a first stage frequency router for connecting the optical signals outputted from the first stage frequency convertor means to its outputs according to the frequency channels allocated to the optical signals at each timeslot; a last stage photonic frequency routing type time division highway switch module, including: a plurality of last stage frequency switch means for selectively switching the frequency channels of the optical signals on its inputs at each timeslot; and a last stage frequency router for connecting the optical signals outputted from the last stage frequency switch means to its outputs according to the frequency channels allocated to the optical signals at each timeslot; and a plurality of last stage frequency multiplexed output buffer means for outputting the optical signals outputted from the last stage frequency router to the output highways such that a plurality of optical signals with different frequency channels which are in an identical timeslot are outputted at different timeslots; a plurality of intermediate stage photonic frequency routing type time division highway switch modules, each module including: a plurality of intermediate stage frequency switch means for selectively switching the frequency channels of the optical signals on its inputs at each timeslot; and an intermediate stage frequency router for connecting the optical signals outputted from the intermediate stage frequency switch means to its outputs according to the frequency channels allocated to the optical signals at each timeslot; and a plurality of frequency multiplexed internal links for cross-connecting the first, last, and intermediate stage photonic frequency routing type time division highway switch modules in multi-stages.

Other features and advantages of the present invention will become apparent from the following description taken in conjunction with the accompanying drawings.

BRIEF DESCRIPTION OF THE DRAWINGS

FIG. 4B is a table indicating the frequency channel corresponding to each input and output highway pair in the frequency router of FIG. 4A.

DETAILED DESCRIPTION OF THE PREFERRED EMBODIMENTS

Figure 1:
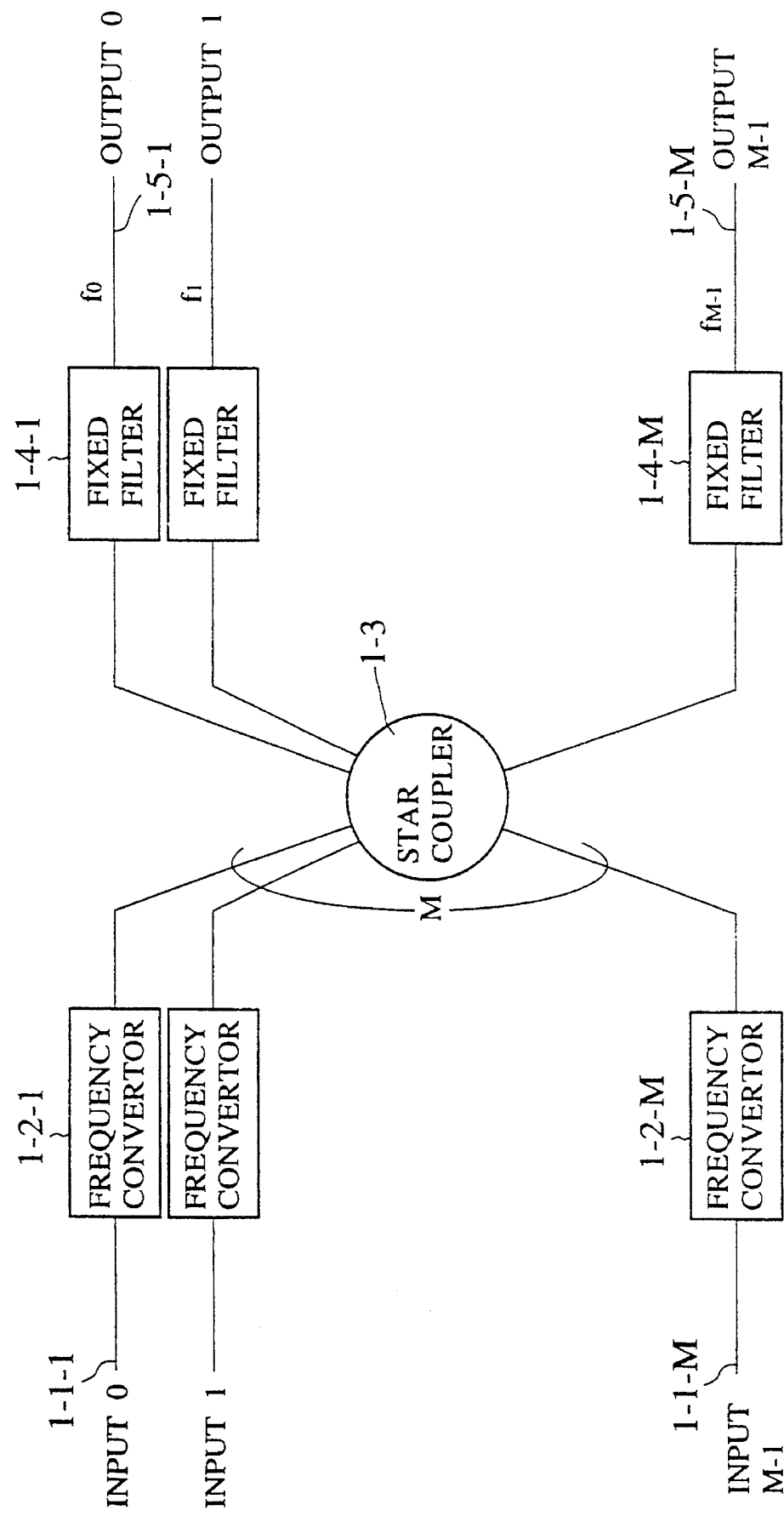
FIG. 1 is a schematic block diagram of a conventional M×M photonic frequency routing type time division highway switch.
Figure 2:
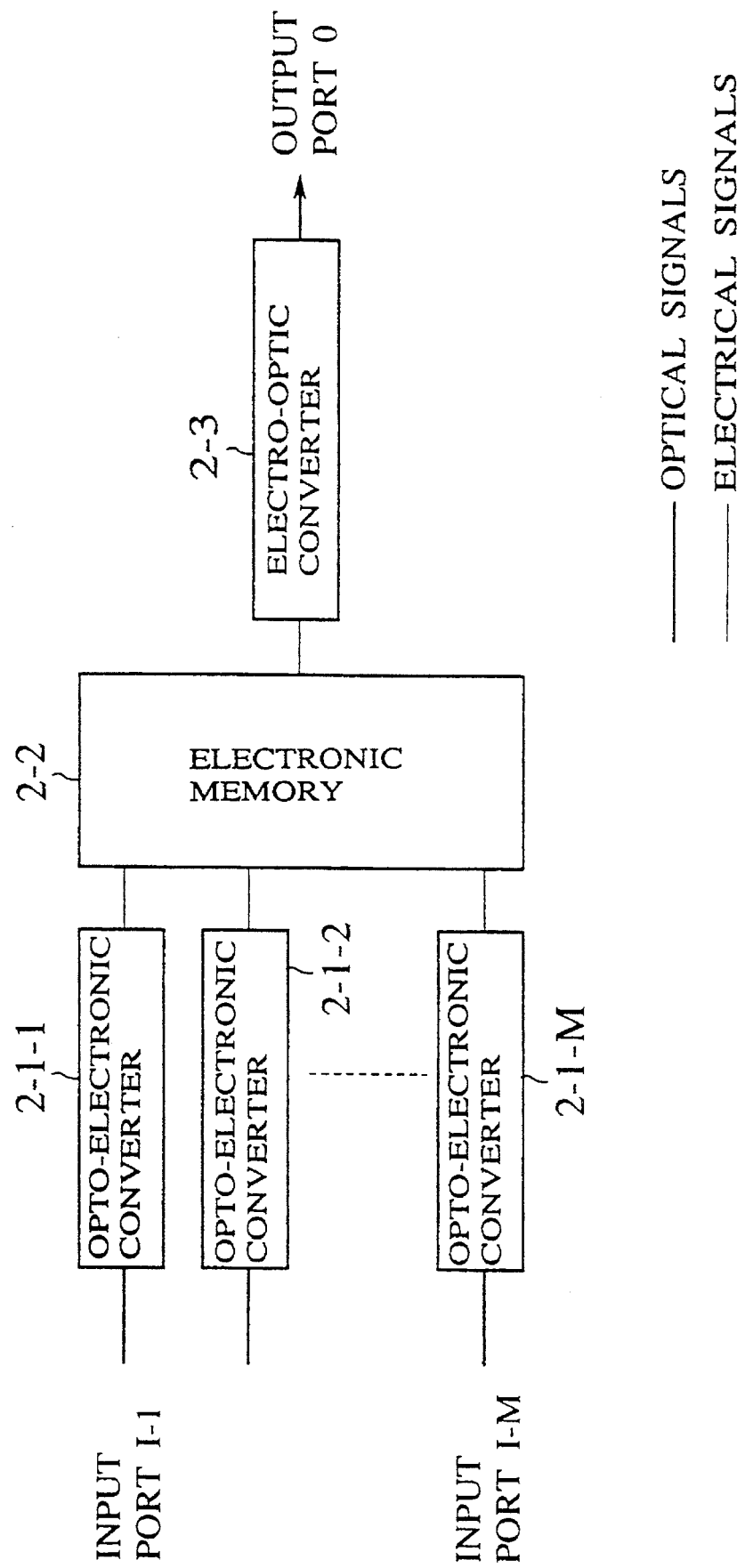
FIG. 2 is a schematic block diagram of a conventional photonic buffer memory.
Figure 3:
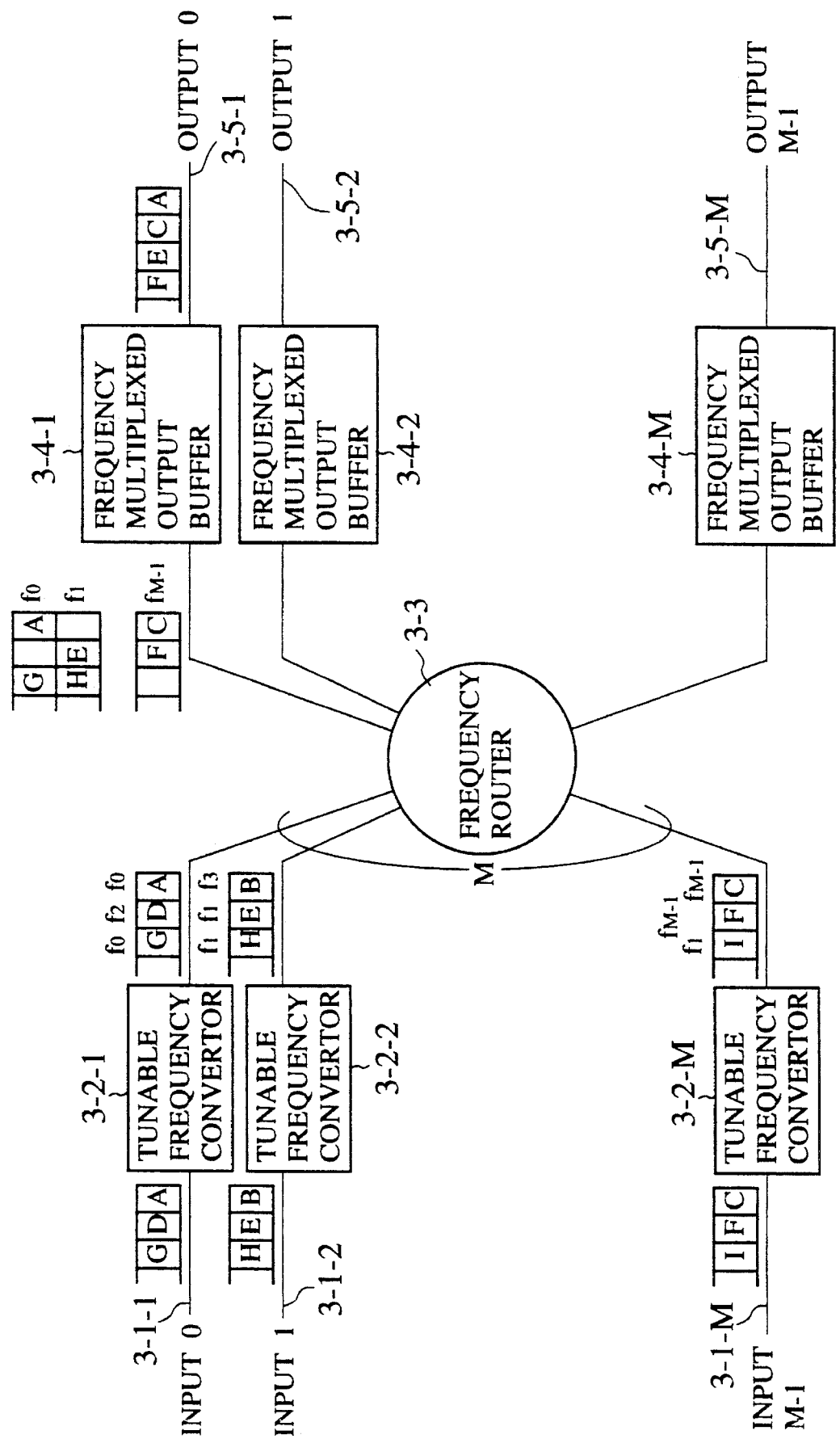
FIG. 3 is a schematic block diagram of one embodiment of a photonic frequency routing type time division highway switch according to the present invention.

Referring now to FIG. 3, one embodiment of a photonic frequency routing type time division highway switch according to the present invention will be described.

In this embodiment, the photonic frequency routing type time division highway switch has a configuration as shown in FIG. 3, which comprises: M input highways 3-1-1 to 3-1-M connected to an input side of a M×M frequency router 3-3 through M tunable frequency convertors 3-2-1 to 3-2-M, and M output highways 3-5-1 to 3-5-M connected to an output side of the frequency router 3-3 though M frequency multiplexed output buffers 3-4-1 to 3-4-M.

In this configuration of FIG. 3, the optical cells on each of the input highways 3-1-1 to 3-1-M are assigned with prescribed frequency channels at each timeslot by one of the tunable frequency convertors 3-2-1 to 3-2-M provided on each input highway. Here, the prescribed frequency channels to be assigned to the optical cells are those which correspond to the output highways for each input highway as will be more fully described below.

Then, the frequency router 3-3 at which the input highways 3-1-1 to 3-1-M are bundled together outputs each incoming optical cell to a prescribed one of the output highways 3-5-1 to 3-5-M according to the frequency channel assigned to each optical cell. For instance, the optical cells "A" and "G" on the 0-th input highway 3-1-1 assigned with the frequency channel $f_0$ are outputted to the 0-th output highway 3-5-1, and the optical cells "E" and "H" on the 1st input highway 3-1-2 assigned with the frequency channel $f_1$ are also outputted to the 0-th output highway 3-5-1, and so on. Here, in general, the suffix i of the frequency channel $f_i$ entering from the j-th input highway 3-1-j and outputted to the k-th output highway 3-5-k can be expressed as the residue system of base M, i.e.:

$$i = (j+k) \text{ modulo } M \qquad (1)$$

Figure 4A:
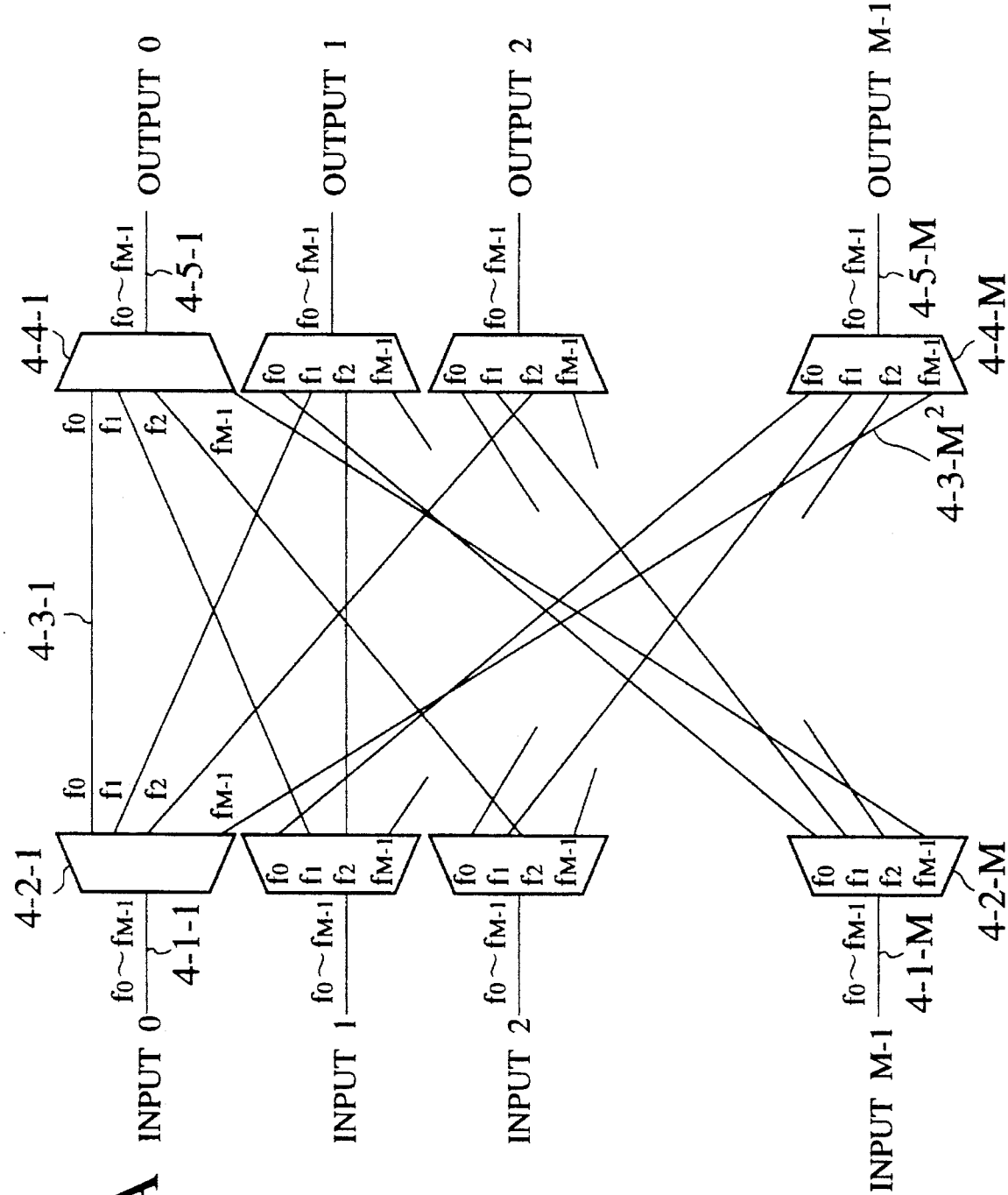
FIG. 4A is an equivalent circuit diagram of a frequency router in the configuration of FIG. 3.

In order to indicate the frequency channels which determine the input and output highway connections at the frequency router 3-3, the equivalent circuit diagram of this frequency router is shown in FIG. 4A while the frequency channel corresponding to each input and output highway pair is tabulated in FIG. 4B. The circuit configuration of FIG. 4A comprises M demultiplexers 4-2-1 to 4-2-M connected with the input highways 4-1-1 to 4-1-M, respectively, M multiplexers 4-4-1 to 4-4-M connected with the output highways 4-5-1 to 4-5-M, respectively, and $M^2$ internal links 4-3-1 to 4-3-$M^2$ interconnecting the demultiplexers 4-2-1 to 4-2-M with the multiplexers 4-4-1 to 4-4-M so as to realize the relationship of the above equation (1) which is summarized in the table of FIG. 4B. Here, the optical cells on the input highways which are going to be connected with a particular output highway have mutually different frequency channels, so that they can be distinguished from each other even when they arrive simultaneously. Those optical cells which are arriving at the frequency router 3-3 simultaneously are subsequently outputted to different timeslots by the frequency multiplexed output buffers 3-4-1 to 3-4-M.

Figure 5:
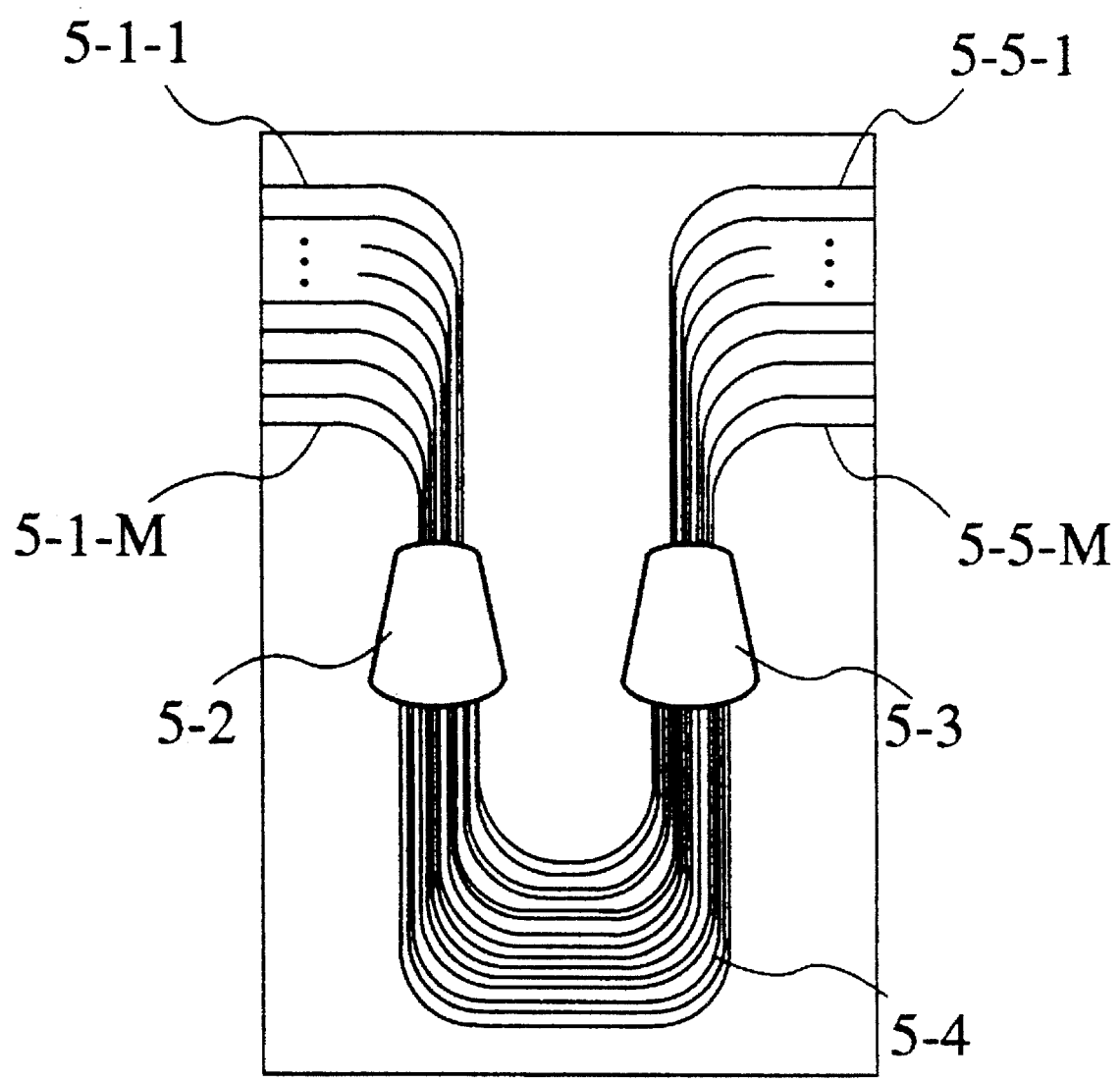
FIG. 5 is a schematic diagram of an arrayed waveguide grating multiplexer filter suitable for the frequency router in the configuration of FIG. 3.

This frequency router 3-3 can be realized by using an arrayed waveguide grating filter shown in FIG. 5, as disclosed in Japanese Patent Application Laid Open No. 2-2444105 (1990), which comprises: M input optical waveguides 5-1-1 to 5-1-M, M output optical waveguides 5-5-1 to 5-5-M, and an arrayed waveguide grating 5-4 connected with the input optical waveguides 5-1-1 to 5-1-M through a slab shaped optical waveguide 5-2 and with the output optical waveguides 5-5-1 to 5-5-M through a slab shaped optical waveguide 5-3. The frequency multiplexed optical cells entering from each of the input optical waveguides 5-1-1 to 5-1-M are diffracted by the slab shaped optical waveguide 5-2, and entered into the arrayed waveguide grating 5-4. Here, due to the non-interference property of the lights, the optical cells entering from a plurality of input optical waveguides 5-1-1 to 5-1-M at the slab shaped optical waveguide 5-2 are going to be entered into the arrayed waveguide grating 5-4 independently from each other.

The arrayed waveguide grating 5-4 comprises a sufficient number of channel waveguides for receiving all the input lights spread out by the diffraction, where the channel waveguides have mutually different lengths so as to function as a diffraction grating. Namely, at this arrayed waveguide grating 5-4, the optical cells in different frequencies are propagated through the arrayed waveguides, and deflected into directions corresponding to the respective frequencies. Then, each optical cell is independently converged onto the output optical waveguides 5-5-1 to 5-5-M by the slab shaped optical waveguide 5-3. Here, due to the angular dispersion of the arrayed waveguide grating, the converging positions are different for different frequencies.

In this manner, a filter in which the input and output optical waveguide connections are different for different frequencies can be constructed. Since this filter is the optical passive circuit, the assignment of the frequency channels shown in FIG. 4B can be determined by its reciprocity. In addition, this filter is loss free in principle.

Figure 6:
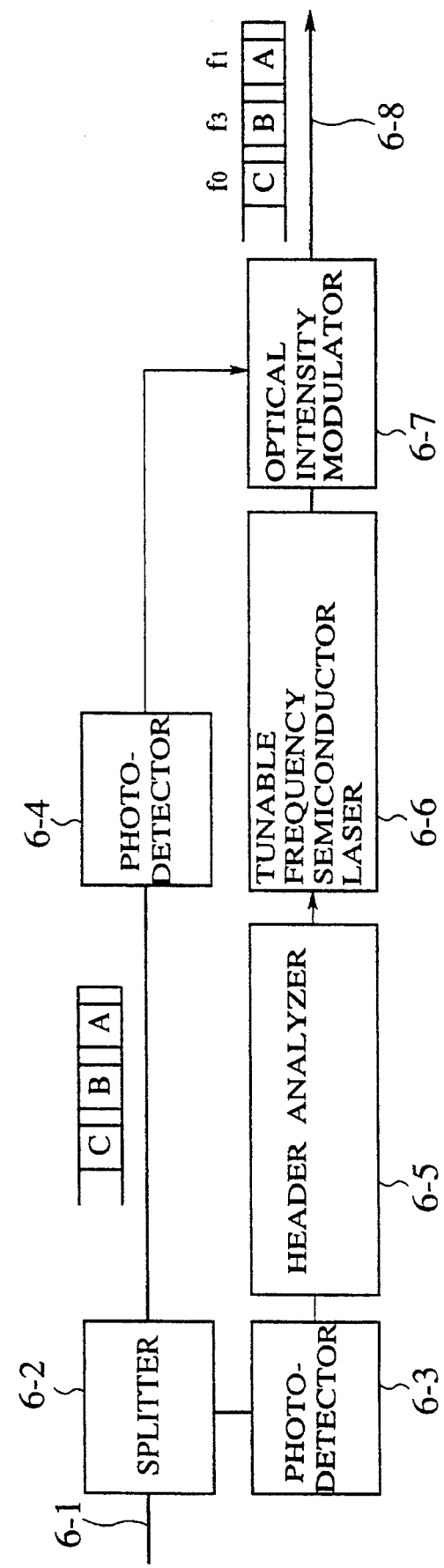
FIG. 6 is a block diagram of a tunable frequency convertor used in the configuration of FIG. 3.

Each of the tunable frequency convertors 3-2-1 to 3-2-M has an exemplary configuration shown in FIG. 6, which comprises: an input highway 6-1 before the frequency conversion, a splitter 6-2 connected with the input highway 6-1, photo-detectors 6-3 and 6-4 connected with the splitter 6-2, a header analyzer 6-5 connected with the photo-detector 6-3, a tunable frequency semiconductor laser 6-6 connected with the header analyzer 6-5, an optical intensity modulator 6-7 connected with the photo-detector 6-4 and the tunable frequency semiconductor laser 6-6, and an input highway 6-8 after the frequency conversion which is connected with the optical intensity modulator 6-7.

In this configuration of FIG. 6, time division signals entered from the input highway 6-1 are split by the splitter 6-2, and converted into high speed electrical signals by the photo-detectors 6-3 and 6-4. The electrical signals obtained by the photo-detector 6-4 are then used for driving the optical intensity modulator 6-7. On the other hand, the electrical signals obtained by the photo-detector 6-3 are supplied to the header analyzer 6-5, at which the header portion of the signals alone is separated and analyzed, and a control signal corresponding to the frequency channel of the destination is generated according to the analysis of the separated header portion. Then, the obtained control signal is supplied into the tunable frequency semiconductor laser 6-6 so as to generate a laser beam of the prescribed frequency specified by the control signal at each timeslot. Then, the laser beam supplied from the tunable frequency semiconductor laser is modulated at the optical intensity modulator 6-7 according to the electrical signals supplied from the photo-detector 6-4.

Here, it is possible to construct the entire frequency convertor optically if it is possible to use an optically controllable optical intensity modulator, or a tunable frequency semiconductor laser that can be optically controlled to directly modulate the generated laser beam.

Figure 7:
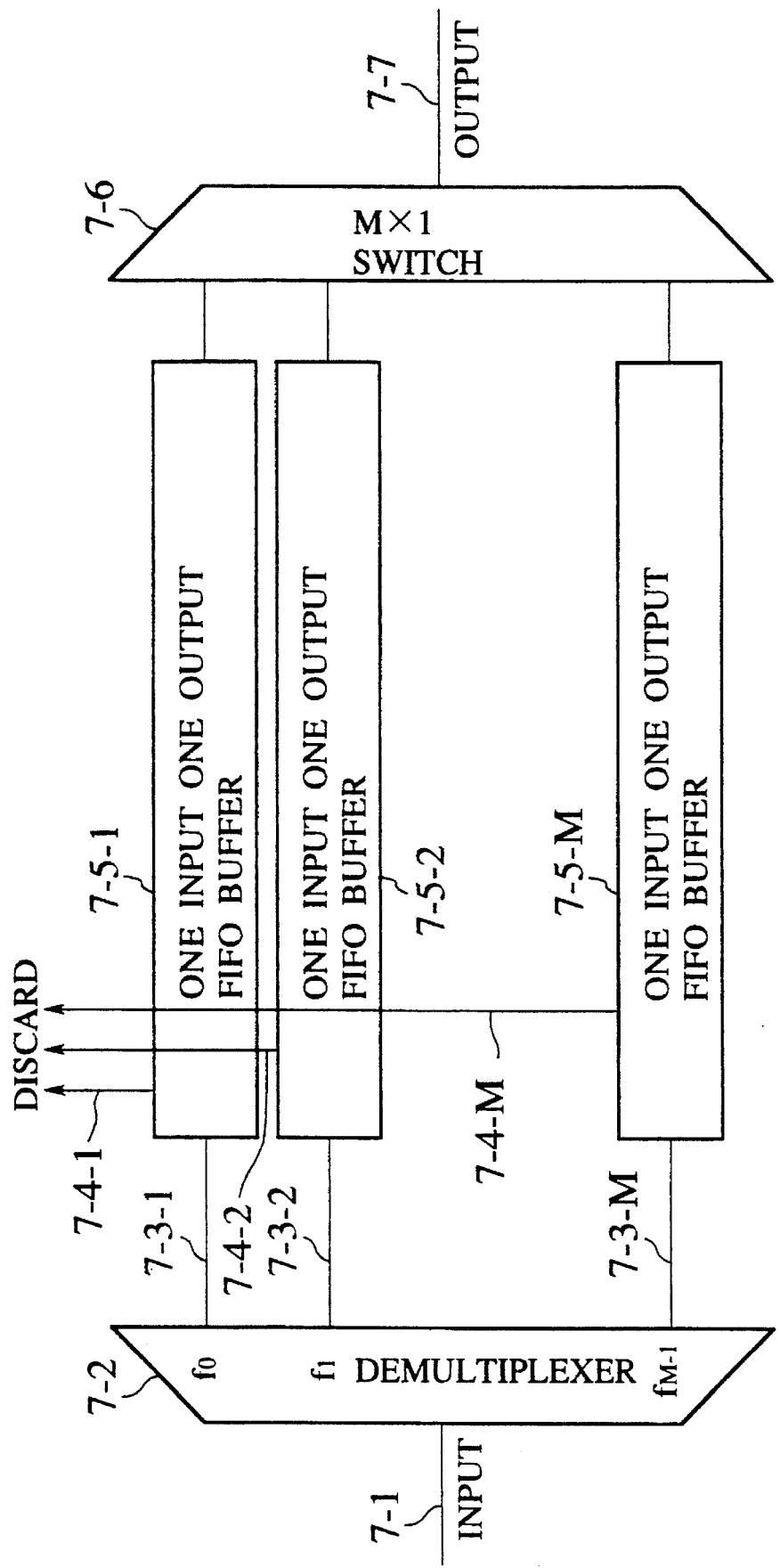
FIG. 7 is a block diagram of a frequency multiplexed output buffer used in the configuration of FIG. 3.

Each of the frequency multiplexed output buffers 3-4-1 to 3-4-M has an exemplary configuration as shown in FIG. 7, in which a one input one output FIFO buffer is provided for each frequency channel. More specifically, this configuration of FIG. 7 comprises; an input signal line 7-1, a demultiplexer 7-2 connected with the input signal line 7-1, optical waveguides 7-3-1 to 7-3-M connected with outputs of the demultiplexer 7-2, signal discarding lines 7-4-1 to 7-4-M for discarding signals from the optical waveguides 7-3-1 to 7-3-M, respectively, one input one output FIFO buffers 7-5-1 to 7-5-M connected with the optical waveguides 7-3-1 to 7-3-M, respectively, an M×1 switch 7-6 connected with outputs of the one input one output FIFO buffers 7-5-1 to 7-5-M, and an output highway 7-7 connected with an output of the M×1 switch 7-6.

In this configuration of FIG. 7, the frequency multiplexed buffer input signals are demultiplexed by the demultiplexer 7-2 and distributed to the optical waveguides 7-3-1 to 7-3-M for respective frequency channels. The time divisional signals of each frequency channel are then buffered by the respective one input one output FIFO buffers 7-5-1 to 7-5-M connected with the optical waveguides 7-3-1 to 7-3-M. The M×1 switch 7-6 selects only one of the output signals of the one input one output FIFO buffers 7-5-1 to 7-5-M and outputs the selected output signal to the output highway 7-7.

Figure 8:
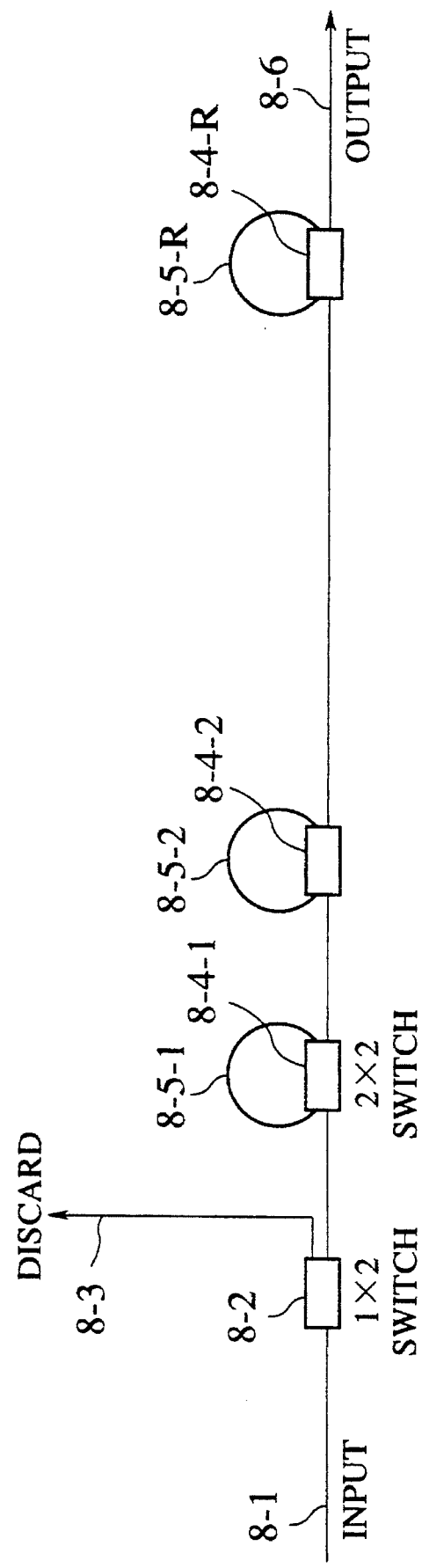
FIG. 8 is a block diagram of one input one output FIFO buffer used in the configuration of FIG. 7.

Here, each of the one input one output FIFO buffers 7-5-1 to 7-5-M can be constructed in a configuration shown in FIG. 8, as described by R. A. Thompson in "Optimizing Photonic Variable-Integer-Delay Circuits", Topical Meeting on Photonic Switching, Mar. 18-20, 1987, pp. 141-143. More specifically, this configuration of FIG. 8 comprises: an input line 8-1, 1×2 switch 8-2 connected with the input line 8-1, a signal discarding line 8-3 connected with the 1×2 switch 8-2, a plurality of 2×2 switches 8-4-1 to 8-4-R connected in series with the output of the 1×2 switch 8-2, loop shaped optical waveguides 8-5-1 to 8-5-R attached to the 2×2 switches 8-4-1 to 8-4-R, respectively, and an output line 8-6. In this configuration of FIG. 8, each of the loop shaped optical waveguides 8-5-1 to 8-5-R has a circumferential length equal to a unit length for switching of the signals, such that each loop functions as one buffer. The 2×2 switches 8-4-1 to 8-4-R are controlled such that any newly arriving signal is stored in an empty loop closest to the output side, and whenever the signal stored at the last (closest to the output side) loop 8-5-R is outputted, all the other signals stored in the other loops are forwarded to next loops. The signal arriving when all the loops are filled by the signals is going to be discarded by the 1×2 switch 8-2 through the signal discarding line 8-3.

In the photonic frequency routing type time division highway switch of this embodiment as described above, the frequency router 3-3 is only connecting the optical signals entered from a plurality of input highways 3-1-1 to 3-1-M to the output highways 3-5-1 to 3-5-M in units of the frequency channels, and not distributing the input signals to the output highways 3-5-1 to 3-5-M. Consequently, in principle, the optical signals can be transmitted without any loss. In addition, the signals from the different inputs to the same output always have different frequency channels, so that there is no need for the conflict control at the input side because each of the frequency multiplexed output buffers 3-4-1 to 3-4-M outputs the signals on the same timeslot at the different timeslots.

Thus, according to this embodiment, it is possible to provide a photonic frequency routing type time division highway switch which requires no conflict control at the input side, and incorporates no inherent splitting loss of the optical signal power.

Now, the modifications of the above embodiment will be described.

Figure 9:
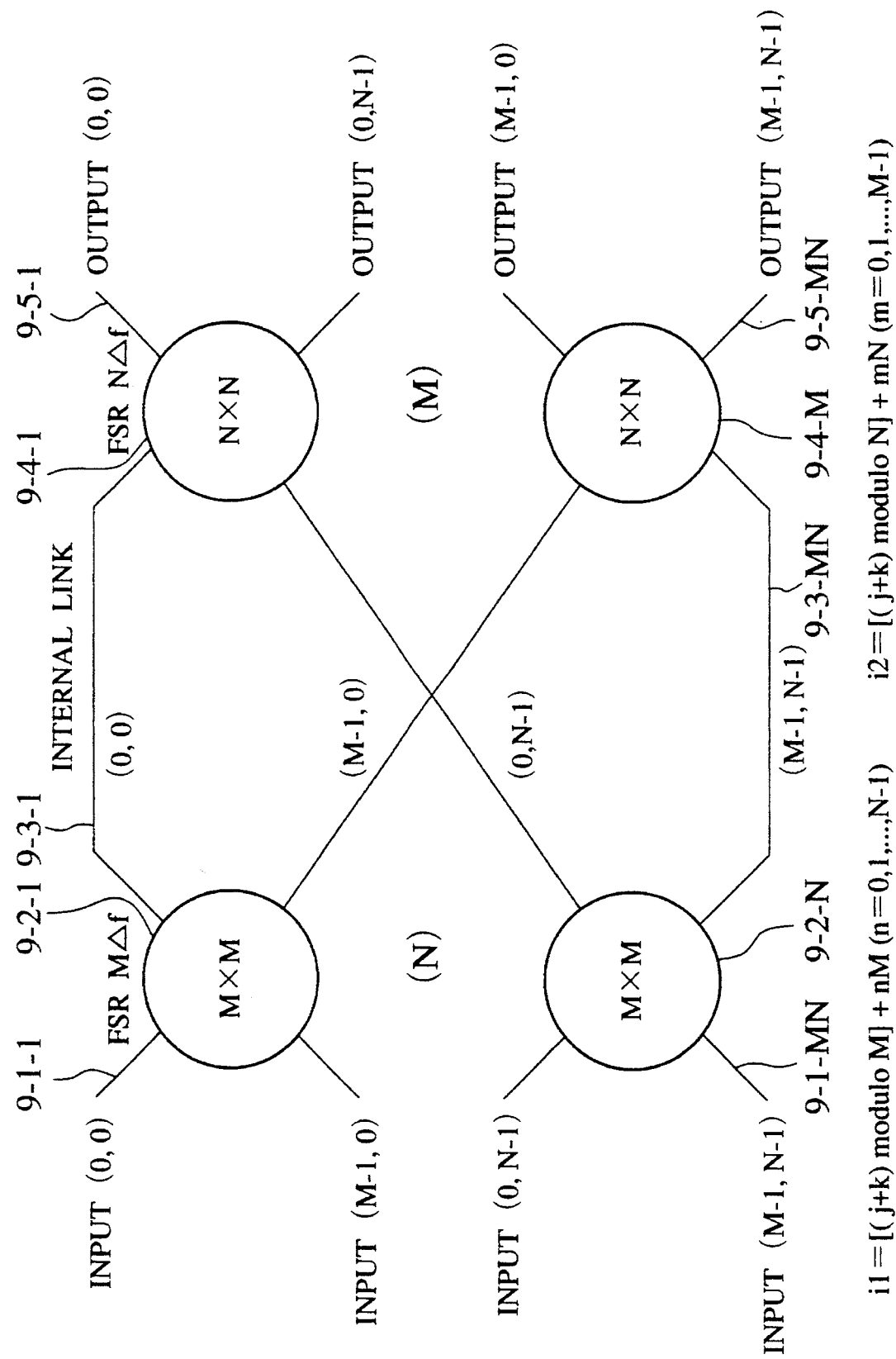
FIG. 9 is a schematic block diagram of one modified configuration for the frequency router in the configuration of FIG. 3.

FIG. 9 shows a modified configuration in which a multi-terminal frequency router is constructed by connecting a plurality of unit frequency routers each of which has a limited number of terminals. More specifically, this configuration of FIG. 9 comprises: MN pieces of input highways 9-1-1 to 9-1-MN, N pieces of M×M frequency routers 9-2-1 to 9-2-N connected with the input highways 9-1-1 to 9-1-MN, M pieces of N×N frequency routers 9-4-1 to 9-4-M cross-connected with the M×M frequency routers 9-2-1 to 9-2-N through internal links 9-3-1 to 9-3-MN, and MN pieces of output highways 9-5-1 to 9-5-MN connected with the N×N frequency routers 9-4-1 to 9-4-M, where M and N are relatively prime natural numbers.

When the frequency channel interval is set to be $\Delta f$, the M×M frequency routers 9-2-1 to 9-2-N have an FSR (Free Spectral Range) equal to $M\Delta f$, while the N×N frequency routers 9-4-1 to 9-4-M have an FSR equal to $N\Delta f$. For example, the signals in the frequency channels $f_\emptyset$ to $f_{MN-1}$ entered from the input highway (0, 0) 9-1-1 are demultiplexed into M groups of N channels and lead to the internal links (0, 0) 9-3-1 to (M-1, 0). N channels on the internal link (0, 0) 9-3-1 are then demultiplexed in units of channels by the N×N frequency router 9-4-1 in the second stage and lead to the output highways (0, 0) 9-5-1 to (0, N-1). Here, M and N are required to be relatively prime natural numbers as mentioned above, and in general, the suffix i1 of the frequency channel $f_{i_1}$ for connecting the input (j,x) and the input (k,x), where x=0.1, . . . , N-1 is expressed as:

$$i1 = [(j+k) \text{ modulo } M] + nM \quad (2)$$

where n=0,1, . . . , N-1, while the suffix 12 of the frequency channel $f_{i_2}$ for connecting the input (y, j) and the input (y, k), where y=0, 1, . . . , M-1 is expressed as:

$$i2 = [(j+k) \text{ modulo } N] + mN \quad (3)$$

where m=0, 1, . . . , M-1.

It is to be noted that although FIG. 9 only shows a simplest case of two stage connections, the multi-stage connection with three or more stages of the frequency routers can be constructed similarly. In such a generalized case of the multi-stage connection, there is a requirement that the number of terminals at each stage must be relatively prime with the number of terminals at every other stage.

Figure 10:
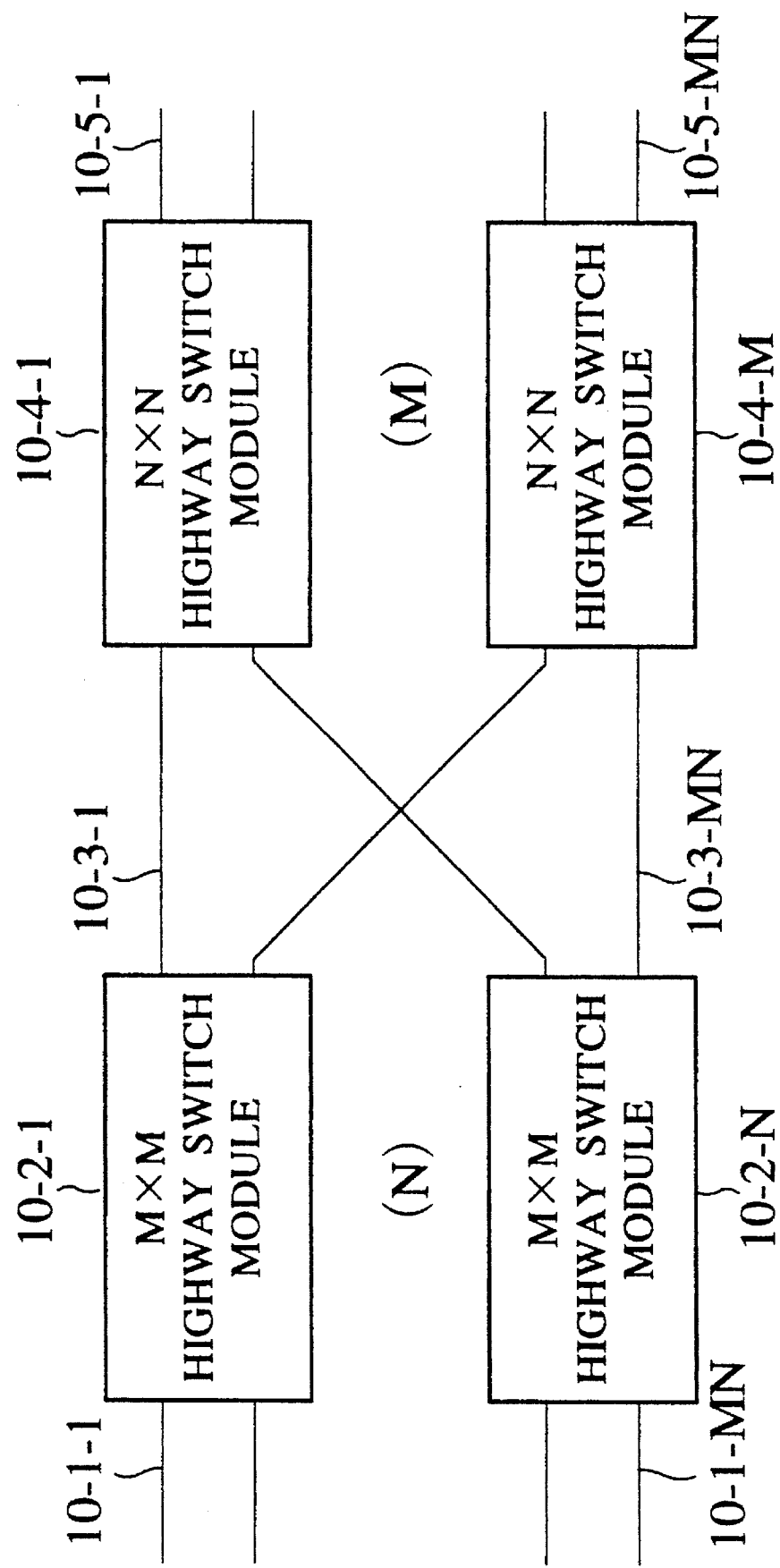
FIG. 10 is a schematic block diagram of one modified configuration for the photonic frequency routing type time division highway switch according to the present invention.

FIG. 10 shows a modified configuration in which a multi-terminal highway switch is constructed by connecting a plurality of highway switch modules each of which has a single frequency router with a limited number of terminals. More specifically, this configuration of FIG. 10 comprises: MN pieces of input highways 10-1-1 to 10-1-MN, N pieces of M×M highway switch modules 10-2-1 to 10-2-N connected with the input highways 10-1-1 to 10-1-MN, M pieces of N×N highway switch modules 10-4-1 to 10-4-M cross-connected with the M×M highway switch modules 10-2-1 to 10-2-N through internal links 10-3-1 to 10-3-MN, and MN pieces of output highways 10-5-1 to 10-5-MN connected with the N×N highway switch modules 10-4-1 to 10-4-M, where M and N are natural numbers. Here, each one of the M×M highway switch modules 10-2-1 to 10-2-N and the N×N highway switch modules 10-4-1 to 10-4-M has a configuration similar to that shown in FIG. 3 described above.

It is to be noted that although FIG. 10 only shows a simplest case of two stage connections, the multi-stage connection with three or more stages of the highway switch modules can be constructed similarly.

Figure 11:
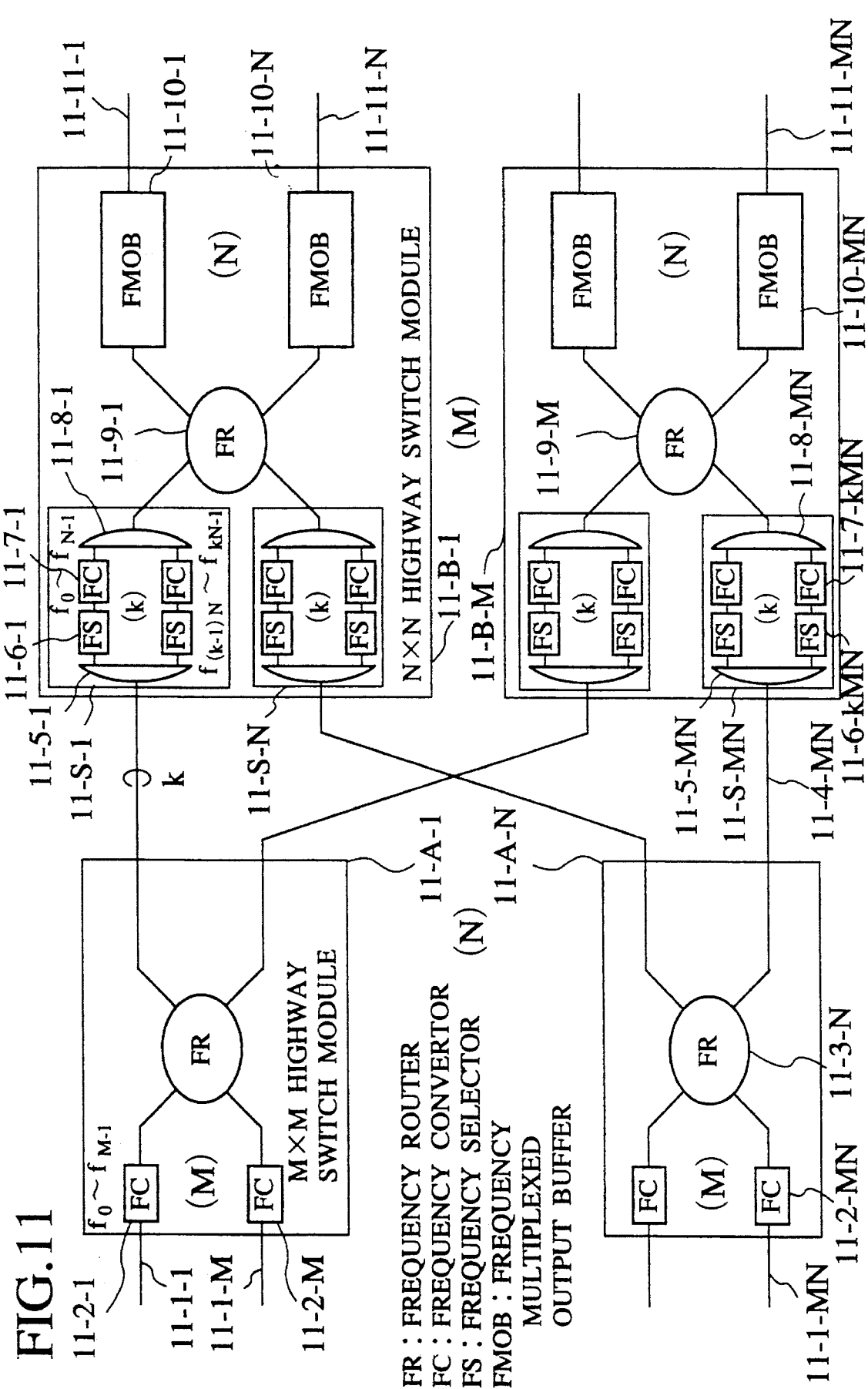
FIG. 11 is a schematic block diagram of another modified configuration for the photonic frequency routing type time division highway switch according to the present invention.

FIG. 11 shows another modified configuration in which a multi-terminal highway switch is also constructed by connecting a plurality of highway switch modules each of which has a single frequency router with a limited number of terminals. More specifically, this configuration of FIG. 11 comprises: MN pieces of input highways 11-1-1 to 11-1-MN, N pieces of M×M highway switch modules 11-A-1 to 11-A-N connected with the input highways 11-1-1 to 11-1-MN, M pieces of N×N highway switch modules 11-B-1 to 11-B-M cross-connected with the M×M highway switch modules 11-A-1 to 11-A-N through frequency multiplexed internal links 11-4-1 to 11-4-MN, and MN pieces of output highways 11-11-1 to 11-11-MN connected with the N×N highway switch modules 11-B-1 to 11-B-M, where M and N are natural numbers.

Here, the M×M highway switch module 11-A-1 comprises: frequency convertors 11-2-1 to 11-2-M connected with the input highways 11-1-1 to 11-1-M; and a frequency router 11-3-1 connected with the frequency convertors 11-1-1 to 11-1-M on its input side and with frequency multiplexed internal links 11-4-1 to 11-4-M on its output side. Each of the other M×M highway switch modules 11-A-2 to 11-A-N also has a similar configuration.

On the other hand, the N×N highway switch module 11-B-1 comprises: frequency switches 11-S-1 to 11-S-N connected with the frequency multiplexed internal links from the M×M highway switch modules 11-A-1 to 11-A-N; a frequency router 11-9-1 connected with the frequency switches 11-S-1 to 11-S-N on its input side; frequency multiplexed output buffers 11-10-1 to 11-10-N connected with the output side of the frequency router 11-9-1; and output highway 11-11-1 to 11-11-N connected with the frequency multiplexed output buffers 11-10-1 to 11-10-N. Each of the other N×N highway switch modules 11-B-2 to 11-B-N also has a similar configuration. Here, the frequency switch 11-S-1 comprises: a 1×k splitter 11-5-1 connected with the internal link 11-4-1; k pairs of frequency selector 11-6-1 and frequency convertor 11-7-1, each of which is connected with each output of the 1×k splitter 11-5-1; and a k×1 combiner 11-8-1 connected with the pair of frequency selector 11-6-1 and frequency convertor 11-7-1 on its input side and with the frequency router 11-9-1 on its output side. The frequency switches 11-S-2 to 11-S-MN also has a similar configuration.

In this configuration of FIG. 11, each of the M×M highway switch modules 11-A-1 to 11-A-N in the first stage has a frequency multiplexed output buffer missing from the configuration of FIG. 3, so that it has no buffering function, and therefore the frequency multiplexed signals are transmitted as they are to the N×N highway switch modules 11-B-1 to 11-B-M in the second stage. Each of the N×N highway switch modules 11-B-1 to 11-B-M has the frequency switch in place of the tunable frequency convertor in the configuration of FIG. 3.

The frequency multiplexed signals entered from the frequency multiplexed internal links are distributed into k groups by the splitter 11-5-1 and supplied into the k frequency selectors 11-6-1, each of which selectively outputs one channel so that at most k channels can be selectively outputted from the frequency selectors 11-6-1 collectively. Here, the splitter 11-5-1 can receive at most M channels of signals, but when k<M, the signals of the channels exceeding k are discarded. The selected signals are then converted into the prescribed frequency channels by the frequency convertor 11-7-1, combined by the combiner 11-8-1, and supplied into the frequency router 11-9-1.

Figure 12:
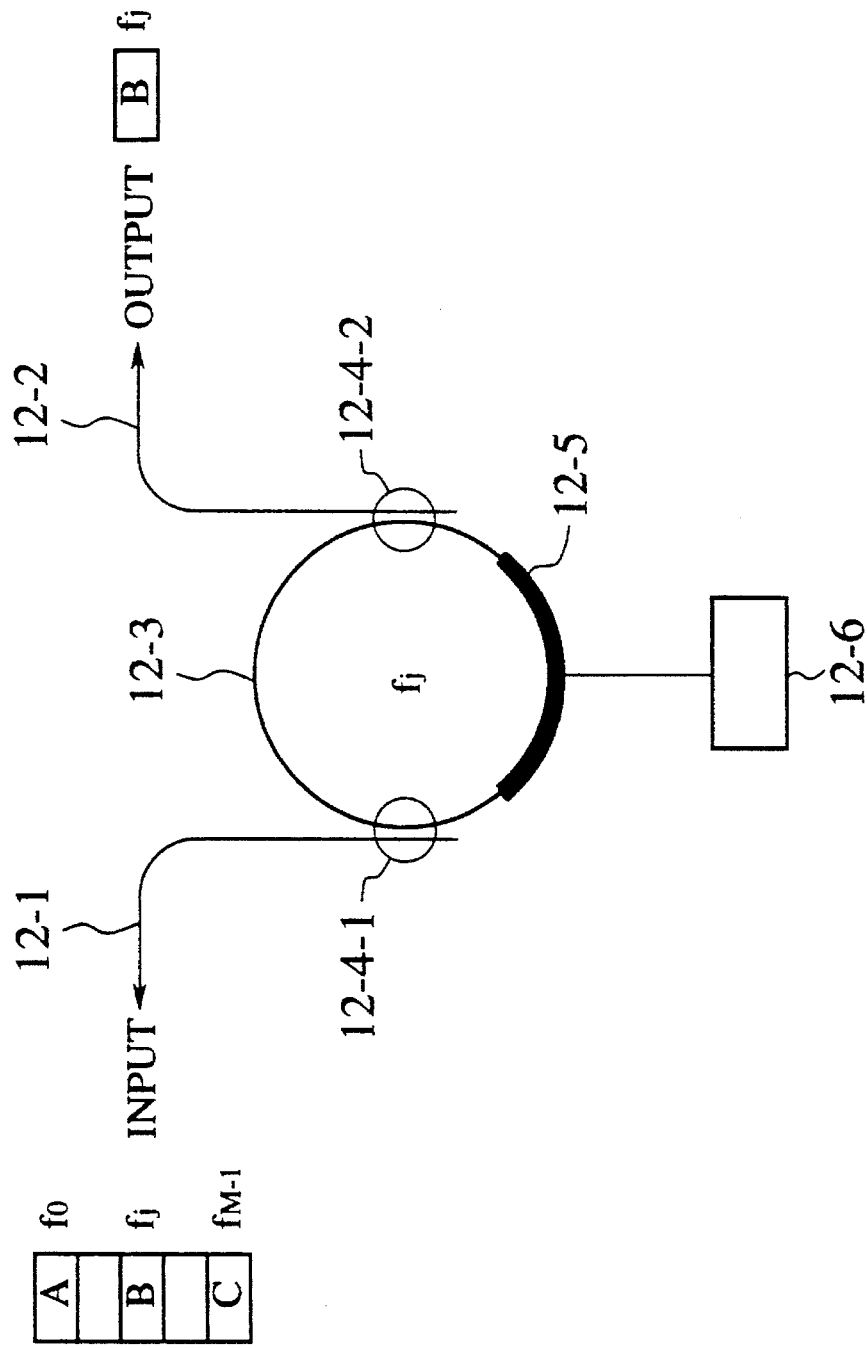
FIG. 12 is a block diagram of a frequency selector used in the modified configuration of FIG. 11.

The frequency selector 11-6-1 has an exemplary configuration as shown in FIG. 12, which comprises: an input port 12-1 for entering the frequency multiplexed signals; an output port 12-2 for outputting the selected signal; a ring shaped optical resonator 12-3 connected between the input port 12-1 and the output port 12-2; directional couplers 12-4-1 and 12-4-2 for coupling the ring shaped optical resonator 12-3 with the input port 12-1 and the output port 12-2, respectively; a phase shifter 12-5 for shifting the optical carrier phase of the signal on the ring shaped optical resonator 12-3, and a power source 12-6 for the phase shifter 12-5. In this configuration of FIG. 12, among the frequency multiplexed signals entered from the input port 12-1, only the frequency channel which coincides with the resonance frequency of the ring shaped optical resonator 12-3 is outputted to the output port 12-2. Here, the resonance frequency of the ring shaped optical resonator 12-3 can be changed by appropriately adjusting the phase shifter 12-5 to change the optical path length of the ring shaped optical resonator 12-3 in accordance with the desired frequency channel to be selected. When the phase shifter 12-5 is adjusted at each timeslot, it is possible to realize the high speed selection of the frequency channel.

Also, there may be a case in which all of these k signals are to be connected to the same output highway, so that in order to prevent the potential conflict at the frequency router 11-9-1, the conversion bandwidth of each frequency converter 11-7-1 is set to be different from the conversion bandwidths of the other frequency converters of the same frequency switch 11-S-1. More specifically, in general $f_i$, $f_{i+N}, \ldots, f_{i+(k-i)N}$ (i=0, 1, ..., N-1) are the frequency channels which are going to be connected to the same output highway.

It is to be noted that although FIG. 11 only shows a simplest case of two stage connections, the multi-stage connection with three or more stages of the highway switch modules can be constructed similarly. In such a generalized case of the multi-stage connection, only the highway switch modules at the last stage are to be in the configuration of the N×N highway switch modules 11-B-1 to 11-B-M described above, while the highway switch modules at all the other stages are to be in the configuration of the M×M highway switch modules 11-A-1 to 11-A-N described above.

In this modified configuration of FIG. 11, the throughput characteristic of the switching network as a whole can be improved compared with a modified configuration of FIG. 10 described above, as the internal links are made to be frequency multiplexed in FIG. 11 unlike the case of FIG. 10. Moreover, this modified configuration is advantageous from the viewpoint of the system construction because the buffers can be arranged collectively at the last stage alone, without distributing the buffers at any other stages.

Figure 13:
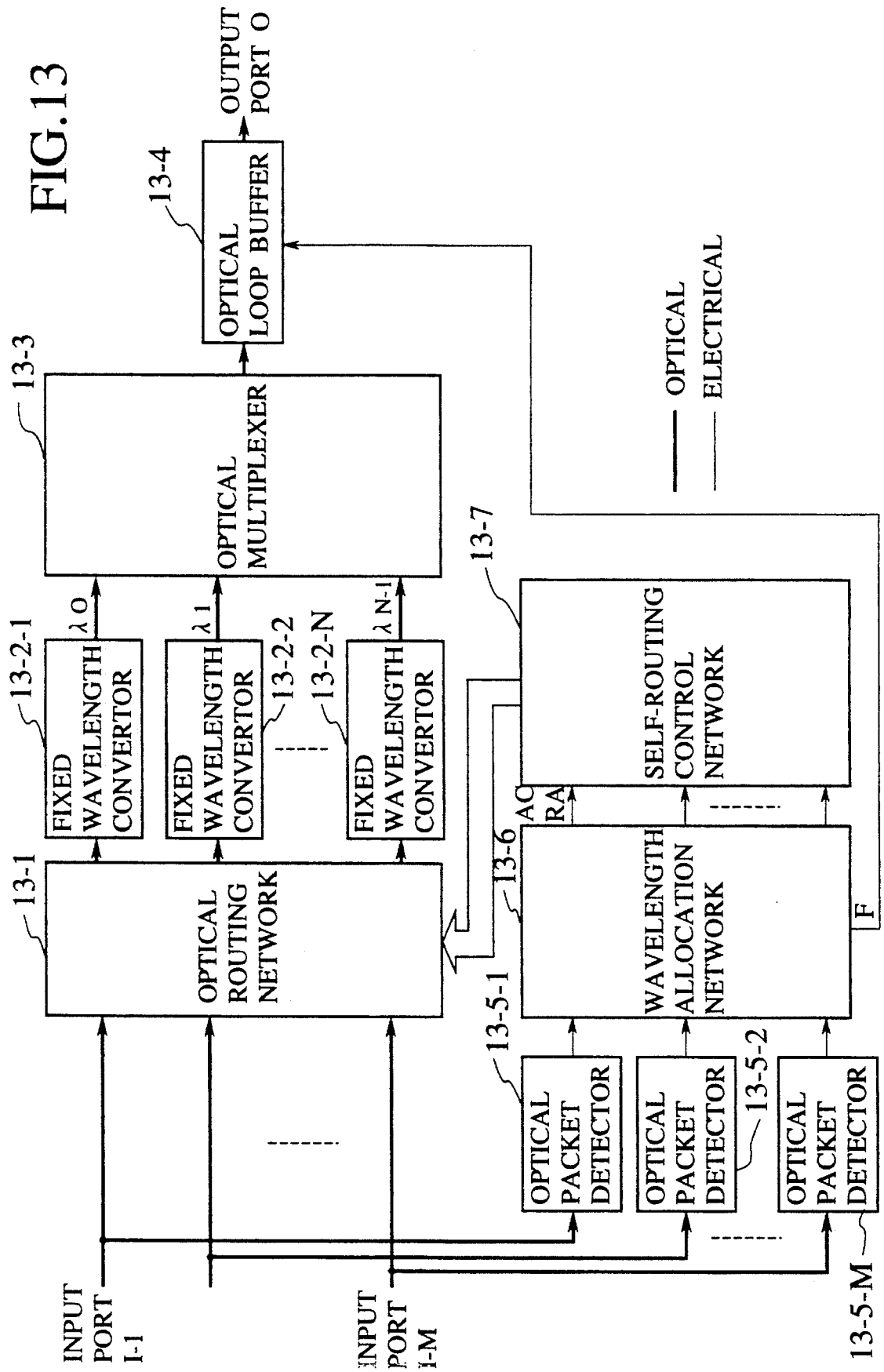
FIG. 13 is a block diagram of a photonic buffer memory configuration suitable for a frequency multiplexed output buffer used in the configuration of FIG. 3.

Referring now to FIG. 13, another embodiment of a photonic buffer memory configuration suitable for the frequency multiplexed output buffer in the photonic frequency routing type time division highway switch of FIG. 3 will be described in detail.

FIG. 13 shows an overall configuration of the photonic buffer memory in this embodiment, which comprises: M×N optical routing network 13-1 connected with M pieces of input ports I-1 to I-M on its input side; N pieces of fixed wavelength convertors 13-2-1 to 13-2-N connected with the output side of the optical routing network 13-1; an optical multiplexer 13-3 connected with the fixed wavelength convertors 13-2-1 to 13-2-N on its input side; an optical loop buffer 13-4 connected between the output side of the optical multiplexer 13-3 and an output port O; M pieces of optical packet detectors 13-5-1 to 13-5-M connected with the input ports I-1 to I-M; a wavelength allocation network 13-6 connected with the optical packet detectors 13-5-1 to 13-5-M on its input side as well as with the optical loop buffer 13-4 on its output side; and a self-routing control network 13-7 connected with the wavelength allocation network 13-6 on its input side as well as with the optical routing network 13-1 on its output side.

With this configuration of FIG. 13, this photonic buffer memory operates as follows.

The input optical packets are entered through any of the M input ports I-1 to I-M at the constant timings which are repeatedly synchronized into the optical routing network 13-1. At the same time, the input optical packets entered through any of the input ports I-1 to I-M are converted into electrical signals by the corresponding ones of the optical packet detectors 13-5-1 to 13-5-M, and outputted as the control packets through the wavelength allocation network 13-6. Each of these control packets comprises an active bit AC indicating a presence or absence of a signal and a wavelength allocation field RA. Here, when each optical packet detector 2-5-k (k=1 to M) detects the optical signal, the active bit AC of the corresponding control packet is set to "1", whereas otherwise the active bit AC of the corresponding control packet is set to "0". Also, in either case, the wavelength allocation field RA is set equal to the value of the active bit AC. Then, the control signal for controlling the optical routing network 13-2 is generated by the wavelength allocation network 13-6 and the self-routing control network 13-7.

Figure 15:
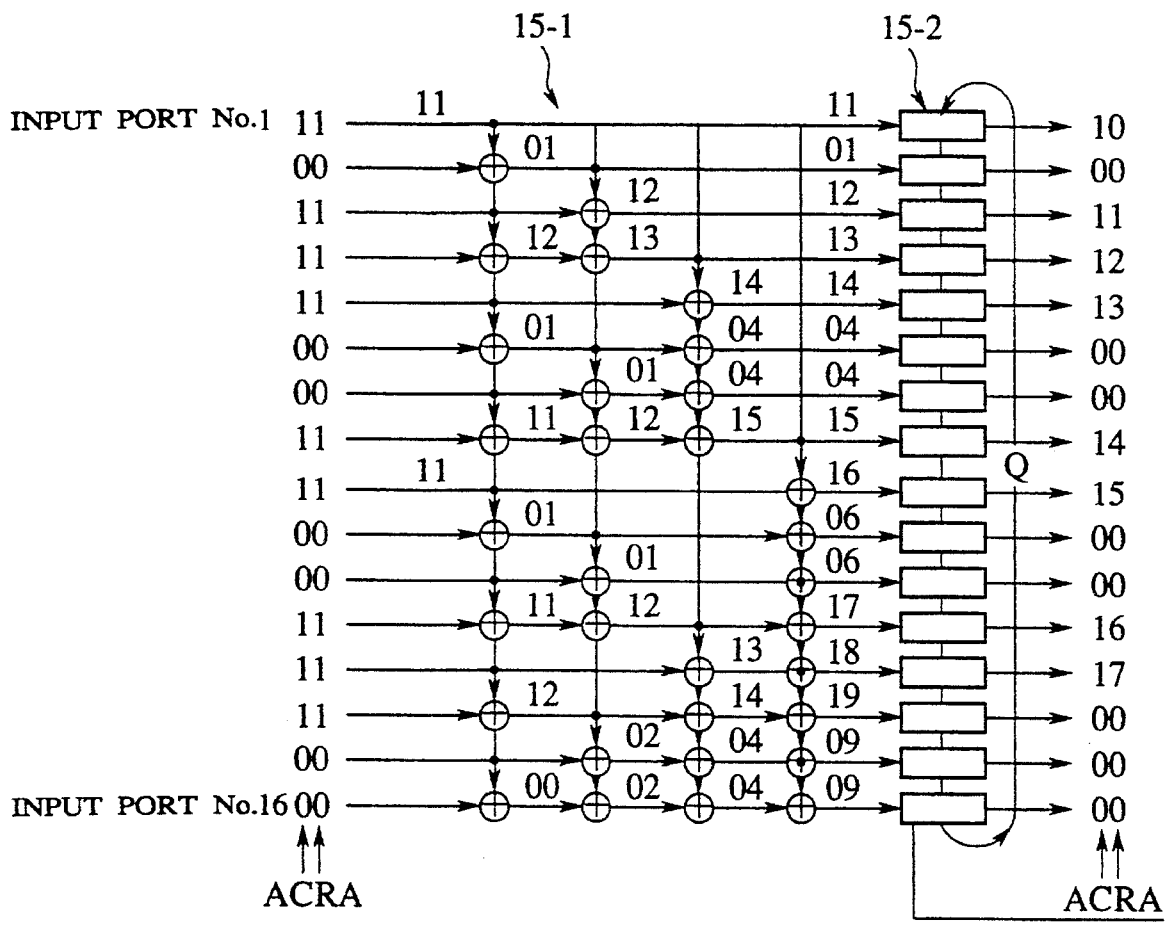
FIG. 15 is a schematic diagram of a wavelength allocation network used in the configuration of FIG. 13.

The wavelength allocation network 13-6 has an exemplary configuration as shown in FIG. 15 in an exemplary case of 18×16 configuration, which comprises a running adder network 15-1 formed by regularly arrayed adders, and an encoder group 15-2 connected with the outputs of the running adder network 15-1.

Figure 16:
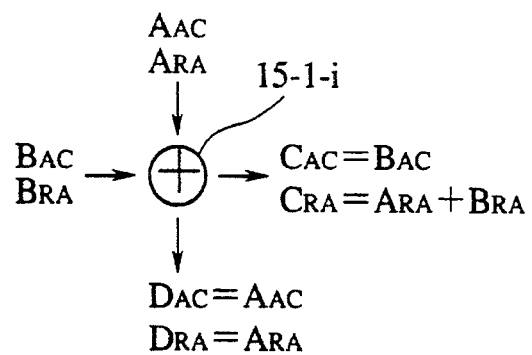
FIG. 16 is a diagram indicating inputs and outputs of an adder in a running adder network used in the configuration of FIG. 15.

The running adder network 15-1 calculates the running sum of the packets arriving simultaneously, and outputs the obtained running sum as the control packet. Namely, as indicated in FIG. 16, each adder 15-1-i constituting the running adder network 15-1 basically receives two input packets A and B, and outputs two output packets C and D. Here, as shown in FIG. 16, the input packet A is a packet which is entered downwards from an upper side node while the input packet B is a packet which is entered to the right from a left side node, and the output packet C is a packet which is outputted to the right to a right side node while the output packet D is a packet which is outputted downwards to the lower node.

Each of the input packets A and B and the output packets C and D comprises the AC field and the RA field, which are indicated by the subscripts AC and RA accompanying the packet symbols A to D in FIG. 16. As indicated in FIG. 16, the adder 15-1-i outputs the output packet C which has the AC field $C_{AC}$ having a value equal to that of the AC field $B_{AC}$ of the input packet B and the RA field $C_{RA}$ having a value equal to a sum of the value of the RA field $A_{RA}$ of the input packet A and the value of the RA field $B_{RA}$ of the input packet B. Also, the adder 15-1-i outputs the output packet D which has the AC field $D_{AC}$ having a value equal to that of the AC field $A_{AC}$ of the input packet A and the RA field $D_{RA}$ having a value equal to that of the RA field $A_{RA}$ of the input packet A.

FIG. 15 shows an exemplary packets outputted at each node of the running adder network 15-1 when nine packets with the value "1" for both the AC field and the RA field have arrived simultaneously, where the output packet at each node is represented by two digits number formed by a first digit indicating the value of the AC field and a second digit indicating the value of the RA field. At 16 output nodes of the running adder network 15-1 corresponding to 16 input nodes of the encoder group 15-2, the packets indicating the running sums of the input packets calculated by the running adder network 15-1 are outputted. More specifically, the AC field of the output packet at each output node has the value "1" when the input packet was entered through the corresponding input node, or the value "0" otherwise. Also, the RA field of the output packet at each output node has the value indicating an order of the input packet at the corresponding input node among all the input packets entered at the input nodes counted from above, i.e., the running sum. In the exemplary case shown in FIG. 15, the input packets are entered at the input ports Nos. 1, 3, 4, 5, 8, 9, 12, 13, and 14, so that the output packets with the AC field having a value "1" are outputted at the 1st, 3rd, 4th, 5th, 8th, 9th, 12th, 13th, and 14th output nodes corresponding to these input nodes among the 16 output nodes of the running adder network 15-1, and the RA fields of these output packets at the 1st, 3rd, 4th, 5th, 8th, 9th, 12th, 13th, and 14th output nodes have values equal to 1, 2, 3, 4, 5, 6, 7, 8, and 9, respectively.

The encoder group 15-2 converts the packet indicating the running sum outputted from the running adder network 15-1 as described above into the control packet for controlling the optical routing network 13-1 according to the following wavelength allocation algorithm, by which the encoder group 15-2 outputs the signal determining which wavelength is to be allocated to which optical packet. Here, in order to explain this wavelength allocation algorithm, the following variables are defined.

N: a number of equivalent buffers, i.e., a number of wavelengths to be multiplexed at the optical loop buffer 13-4. Here, the wavelengths to be multiplexed at the optical loop buffer 13-4 are assigned with numbers 0, 1, 2, ..., N-1 (N=8 in the following example).

Q: a number of optical packets stored in the buffer when a new optical packet arrives (Q=0 to N).

F: a number assigned to the wavelength of the optical packet outputted at the immediately previous timeslot (F=0 to N-1, and F=N-1 in the followig example).

ACi(m)/RAi(m): a value of the AC/RA of the control packet entered in to the encoder corresponding to the m-th input port (m=1 to M).

ACo(m)/RAo(m): a value of the AC/RA outputted from the encoder corresponding to the m-th input port (m=1 to M).

As shown in FIG. 15, the encoder group 15-2 comprises a plurality of encoders connected together in a ring shape. In this encoder group 15-2, the number Q of optical packets stored in this photonic buffer memory is notified to every encoder through a ring shaped connection. Then, each encoder updates the values of the AC and RA fields of the control packet whenever the control packet is received from the running adder network 15-1 as follows.

(1) If ACi(m) = 0, then ACo(m) = 0 and RAo(m) = 0
(2) If Aci(m) = 1 and Q + RAi(m) ≤ N,
 then ACo(m) = 1 and
 RAo(m) = (F + Q + RAI(m)) mod N
(3) If Aci(m) = 1 and Q + RAi(m) > N,
 then ACo(m) = 0 and RAo(m) = 0

The above (1) is an update rule applied in a case there is no input packet. In this case, ACo(m)=0 is sent to the self-routing control network 13-7. As a result, the connection structure within the optical routing network 13-1 is switched according to this control packet having ACo(m)=0 by the self-routing control network 13-7 such that the optical packet from the corresponding m-th input port is going to be blocked within the optical routing network 13-1.

The above (2) is an update rule applied in a case a value in which the number Q of the optical packets currently stored in the buffer is added with a running sum RAi(m) of the newly entered optical packet is less than or equal to the buffer capacity. In this case, ACo(m)=1 is sent to the self-routing control network 13-7. As a result, the connection structure within the optical routing network 13-1 is switched according to this control packet having ACo(m)=1 by the self-routing control network 13-7 such that the optical packet from the corresponding m-th input port is going to be handled as an active packet in the optical routing network 13-1. As for the RA field, the wavelength at a time of storing in the buffer is determined by taking the residue with respect to N of a sum of Q+RAi(m) and the number F of the wavelength outputted at the immediately previous timeslot.

The above (3) is an update rule applied in a case of the buffer overflow. In this case, the corresponding optical packet is discarded within the optical routing network 13-1.

In the above, Q and F are variables indicating the next timeslot, and their values are updated as follows.

$$Q_{new}=[([Q_{old}+RAi(m)-1, N]min), 0]max$$

$F_{new} = (F_{old} + 1) \mod N$

Namely, the variable Q is updated to a value in which the number 1 of the optical packet outputted is subtracted from RAi(m) which is the total sum of a number of the already stored optical packets and a number of newly entered optical packets. Here, however, in a case the updated value is going to exceed the buffer capacity, it is updated to N, and in a case the updated value is going to be a negative value, it is updated to 0. This value is notified to every encoder through the ring shaped connection connecting the encoders of the encoder group 15-2 as already mentioned above. Also, the variable F is updates to a value in which it is increased by one with respect to the buffer capacity N as a base number. This value is sent to the optical loop buffer 13-4 where it is used as the output wavelength selection signal F.

The self-routing control network 13-7 then generates the control signal for switching the connection state within the optical routing network 13-1 according to the control packet so obtained by the wavelength allocation network 13-6.

Figure 17:
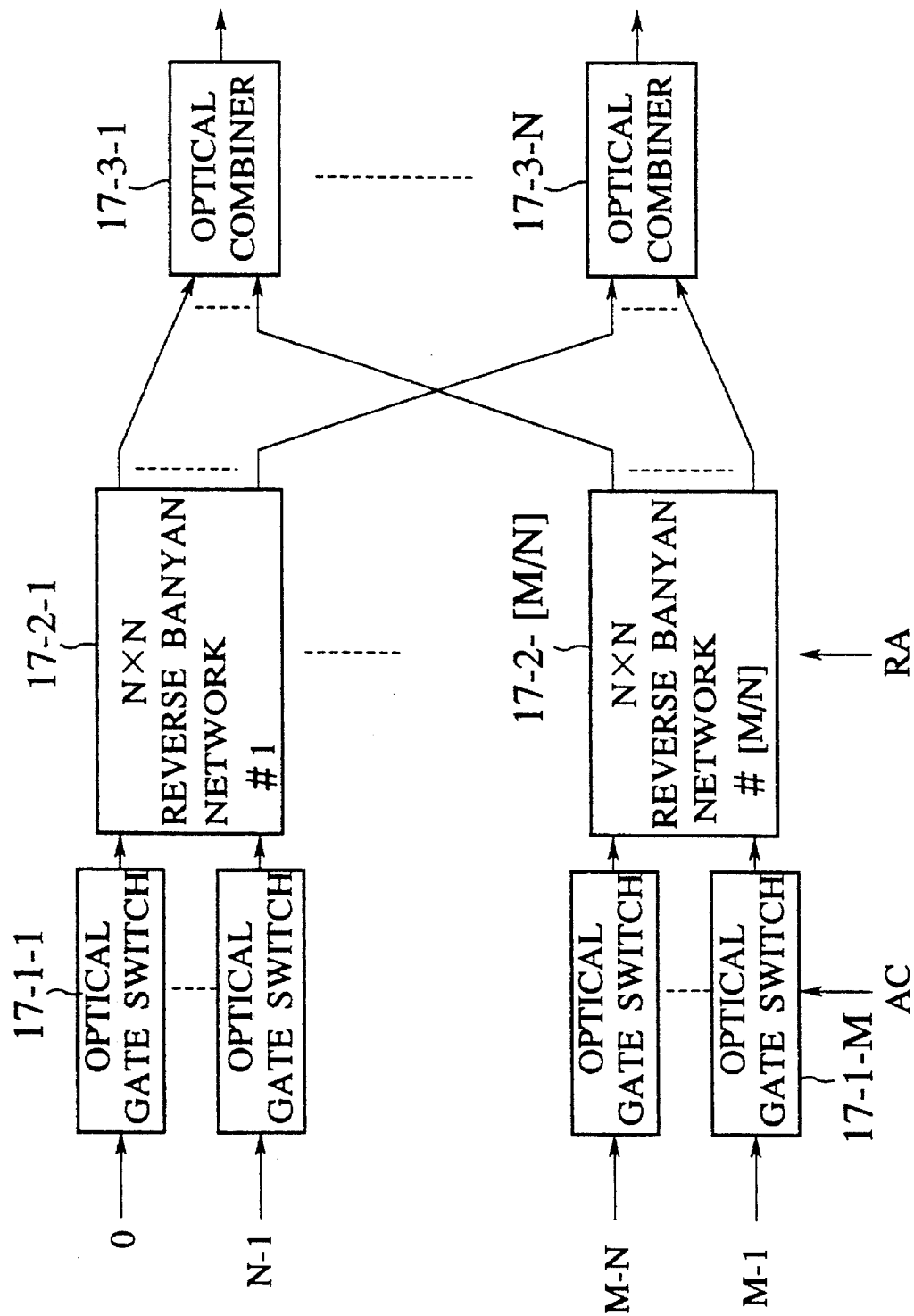
FIG. 17 is a schematic diagram of an optical routing network used in the configuration of FIG. 13.

The optical routing network 13-1 has a configuration as shown in FIG. 17, which comprises: M pieces of optical gate switches 17-1-1 to 17-1-M; M/N pieces of N×N reverse Banyan optical network 17-2-1 to 17-2-[M/N], each of which is connected with N optical gate switches among the optical gate switches 17-1-1 to 17-1-M; and N pieces of optical combiners 17-3-1 to 17-3-N, each of which is connected with one output of each of the N×N reverse Banyan optical network 17-2-1 to 17-2-[M/N]. Here, [M/N] indicates the minimum integer greater than or equal to M/N, so that when M is not divisible by N, the last optical reverse Banyan network having N input ports would not use M mod N pieces of the input ports among the N input ports.

Figure 18:
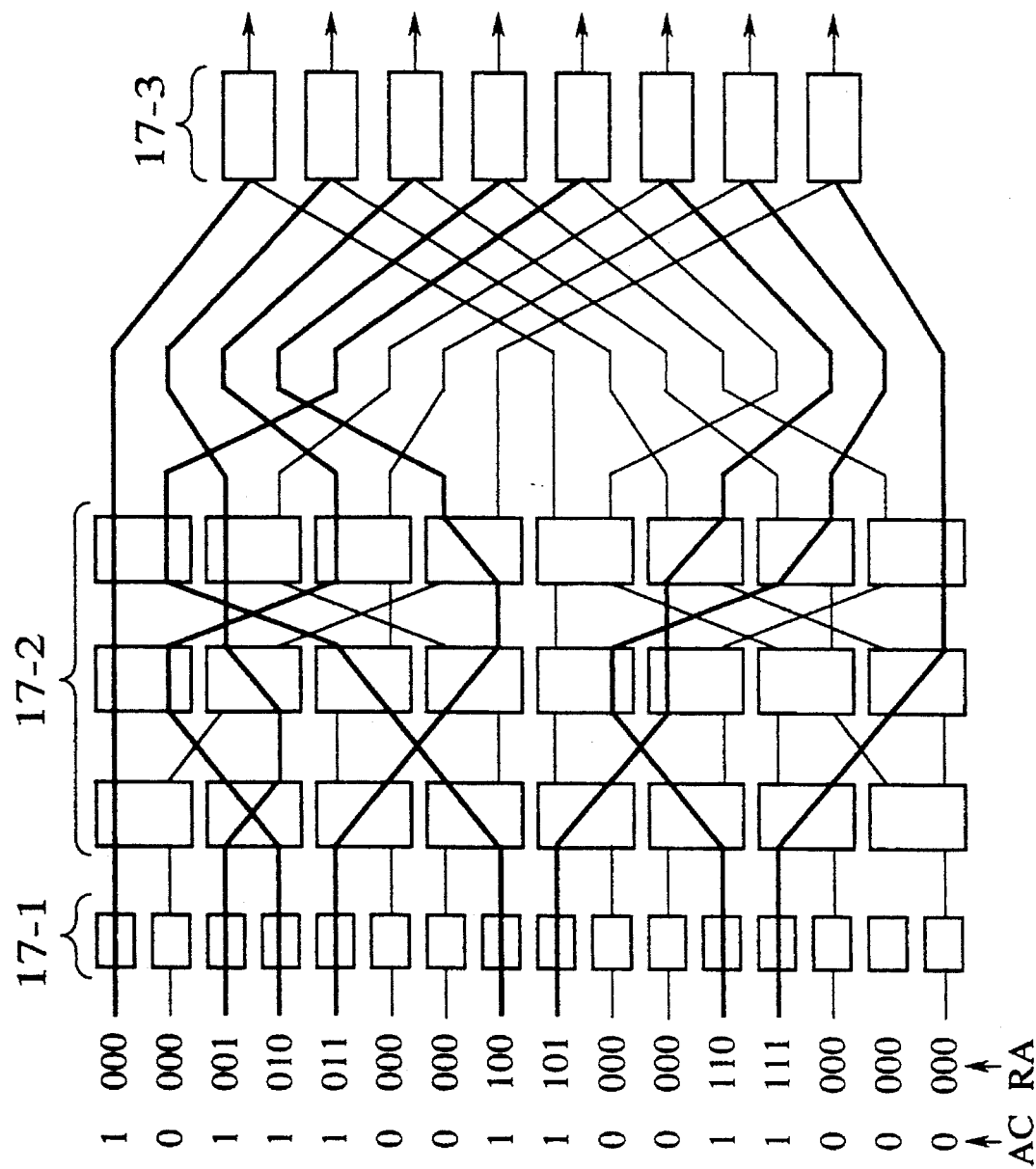
FIG. 18 is a diagram indicating flows of optical packets within the configuration of FIG. 17.

On the other hand, the self-routing control network 13-7 also has a configuration similar to that of the optical routing network 13-1 of FIG. 17, which comprises the reverse Banyan networks along with electrical switches instead of the optical gate switches, where the electrical switches of the self-routing control network 13-7 makes one-to-one correspondence with the optical gate switches of the optical routing network 13-1 such that the control logic of the self-routing control network 13-7 is exactly the same as the control logic of the optical routing network 13-1. Here, the reverse Banyan network has a characteristic of being non-blocking as long as the input control packet signals have the addresses to be distributed to the outputs in an order. Therefore, in the optical routing network 13-1, the optical packets are distributed to the outputs specified the RA fields of the control packets without any blocking. For example, in a case of M=16 and N=8, the flows of the optical packets within the optical routing network 13-1 appears as shown in FIG. 18. In this FIG. 18, the optical routing network 13-1 comprises the optical gate switch portion 17-1, the reverse Banyan network portion 17-2, and the optical combiner portion 17-3, just as in the configuration of FIG. 17.

The flows of the optical packets shown in FIG. 18 are as follows. First, the selections of the packets are made at the optical gate switch portion 17-1 according to the AC fields of the entered optical packets, where the packet with the AC field having a value "1" is passed while the packet with the AC field having a value "0" is blocked. Then, the optical switches at the optical gate switch portion 17-1 and the reverse Banyan network portion 17-2 are switched according to the signals obtained by the self-routing control network 13-7 according to the RA fields of the entering packets. Then, the optical packets arriving at the optical routing network 13-1 flow through the optical switches in the connection state set up as described above, along the routes indicated by thick solid lines in FIG. 18, and reach to the optical combiner portion 17-3. The optical packets combined at the optical combiner portion 17-3 are then supplied to the fixed wavelength convertors 13-2-1 to 13-2-N connected with the optical combiners 17-3-1 to 17-3-N, respectively. The optical packets entered into the fixed wavelength convertors 13-2-1 to 13-2-N are then converted into the optical packets with the wavelengths specific to the respective fixed wavelength convertors 13-2-1 to 13-2-N, and supplied into the optical multiplexer 13-3. Then, the optical packets multiplexed by the multiplexer 13-3 are outputted to the optical loop buffer 13-4, which outputs one optical packet at one timeslot according to the wavelength selection signal F supplied from the wavelength allocation network 13-6.

Figure 19:
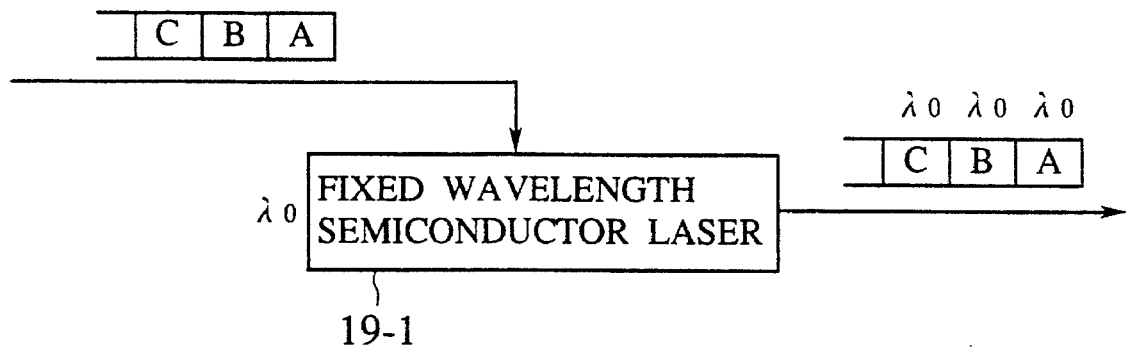
FIG. 19 is a block diagram of a fixed wavelength convertor used in the configuration of FIG. 13.

Each of the fixed wavelength convertors 13-2-1 to 13-2-N has an exemplary configuration shown in FIG. 19, in which the entered optical packets are used as the modulation signals for directly modulating the fixed wavelength semi-conductor laser 19-1. Namely, the modulation is made as the carriers are generated within the semiconductor of the semiconductor laser due to the optical signal power of each optical packet entered into the semiconductor laser such that the index of refraction is changed. Here, the semiconductor laser has the fixed predetermined oscillation wavelength so that the value of the input optical packet signal is carried by the carrier of that predetermined oscillation wavelength.

Figure 21:
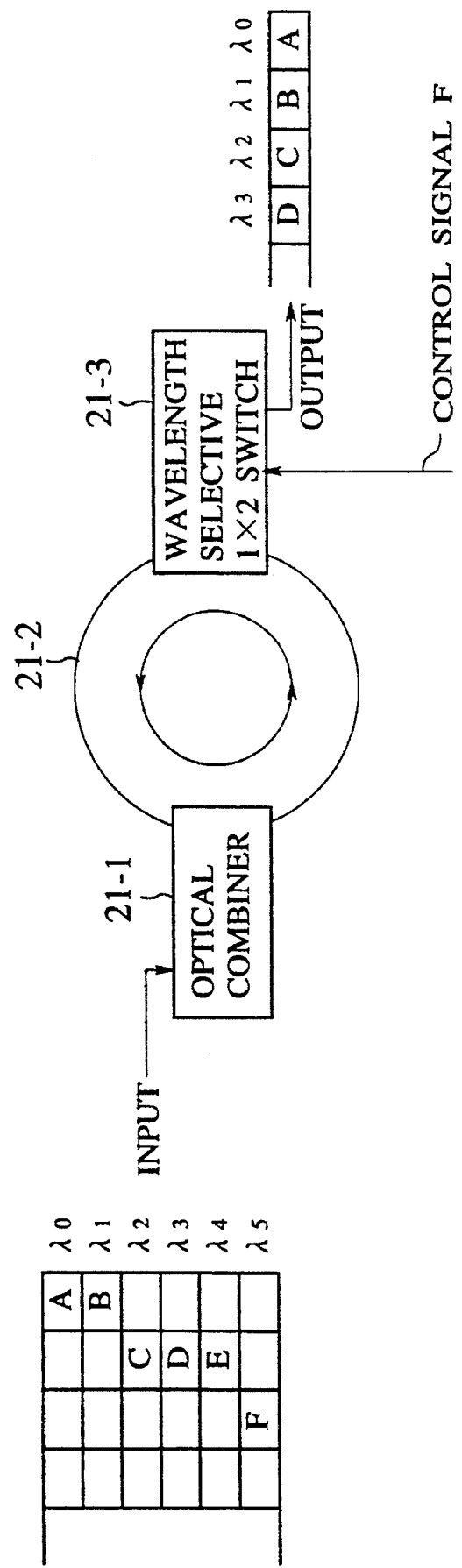
FIG. 21 is a block diagram of an optical loop buffer used in the configuration of FIG. 13.

The optical loop buffer 13-4 has an exemplary configuration as shown in FIG. 21, in which the wavelength multiplexed input optical packets are entered through an optical combiner 21-1 into an optical loop delay line 21-2 and stored therein in the multiplexed state. On the other hand, a wavelength selective 1×2 switch 21-3 selectively outputs the optical packet having a specific wavelength alone among the optical packets stored in the optical loop delay line 21-2 according to the control (wavelength selection) signal F supplied from the wavelength allocation network 13-6. More specifically, the wavelength selective 1×2 switch 21-3 outputs the optical packets circulating in the optical loop delay line 21-2 in an order of their wavelength numbers.

Figure 22:
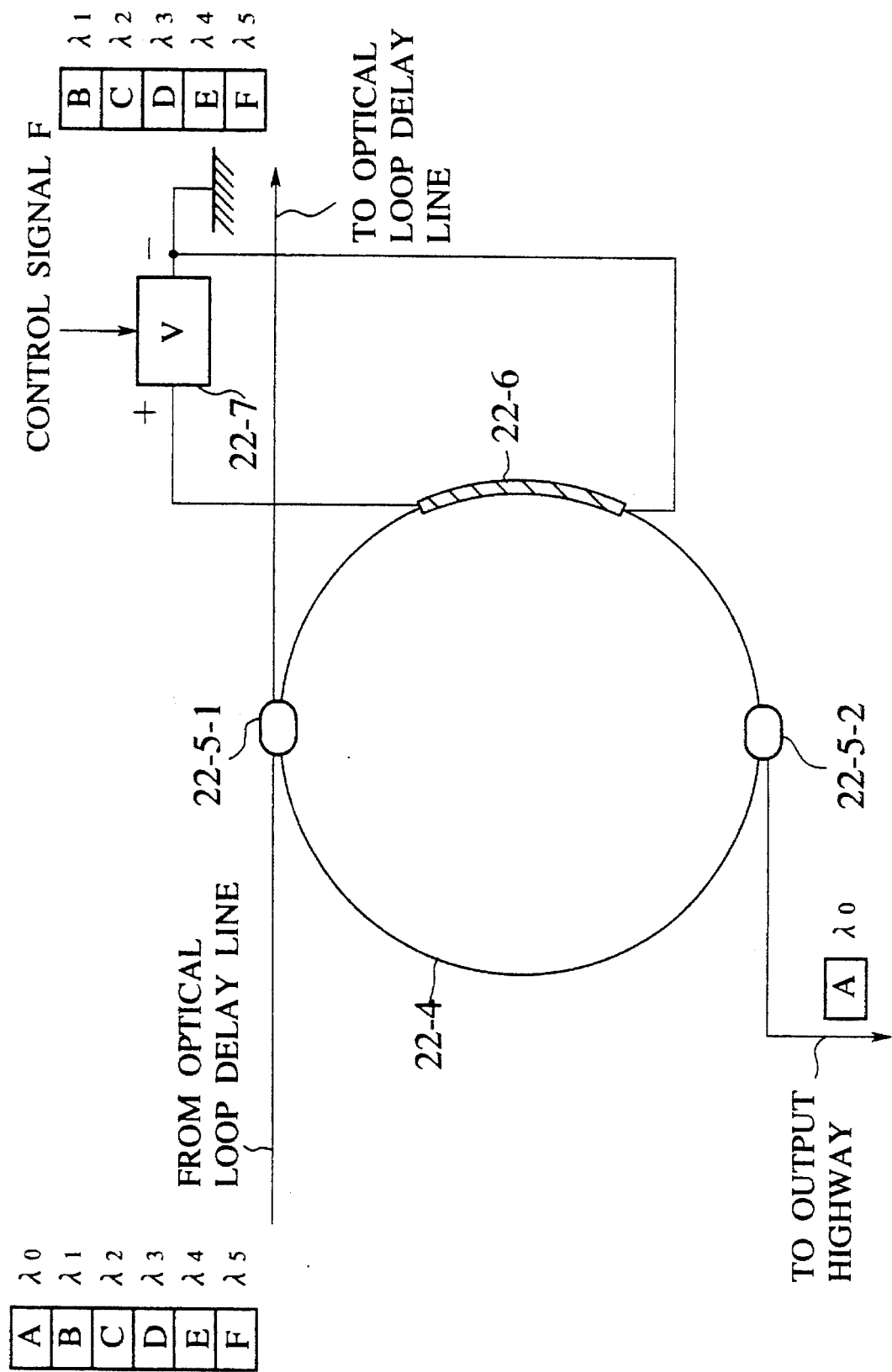
FIG. 22 is a block diagram of a wavelength selective 1×2 switch used in the configuration of FIG. 13.

The wavelength selective 1×2 switch has an exemplary configuration as shown in FIG. 22 which comprises a ring shaped optical resonator 22-4 having optical couplers 22-5-1 and 22-5-2 and a phase shifter 22-6 provided thereon, and a phase shifter setting power source 22-7 for controlling a phase shifting amount by the phase shifter 22-6. In this configuration of FIG. 22, the ring shaped optical resonator 22-4 is connected with the optical loop delay line 21-2 through the optical coupler 22-5-1, and among the wavelength multiplexed signals entering from the optical loop delay line 21-2 through the optical coupler 22-5-1, only the signal having a wavelength which coincides with a wavelength corresponding to the resonance frequency of the ring shaped optical resonator 22-4 is outputted to the output highway through the output port, while all the other signals are returned to the optical loop delay line 21-2. Here, the resonance frequency is determined by the optical path length of the ring shaped optical resonator 22-4, and can be adjusted to a value corresponding to any desired wavelength by changing the optical path length of the ring shaped optical resonator 22-4 by the phase shifter 22-6. Here, the phase shifting amount of the phase shifter 22-6 is adjusted at each timeslot by the phase shifter setting power source 22-7, such that the optical packet of the wavelength predetermined for each timeslot alone can be selectively outputted to the output port at high speed.

According to this photonic buffer memory configuration of FIG. 13, even when the wavelength multiplexed optical packets addressed to the same destination arrive simultaneously in a large capacity optical packet switch with the switch throughput in an order of Tbit/s in which the time series signals in an order of 100 Gbit/s are wavelength multiplexed for over 10 wavelengths, these arriving optical packets can be converted into the predetermined wavelengths without converting them into the electrical signals and without causing any conflict, so that these optical packets can be inputted into the loop buffer in the wavelength multiplexed state and the optical packets can be outputted from the loop buffer, selectively, one by one.

Moreover, by increasing a number of the reverse Banyan networks used for the optical routing network 13-1 and the self-routing control network 13-7, it is possible to construct the very large scale switch in which the hundreds of wavelengths can be multiplexed. In addition, as the processing speed of the electrical control circuits is several tens of times slower than the optical packet signal speed, so that the photonic buffer memory with little electrical bandwidth limitation can be realized.

Figure 14:
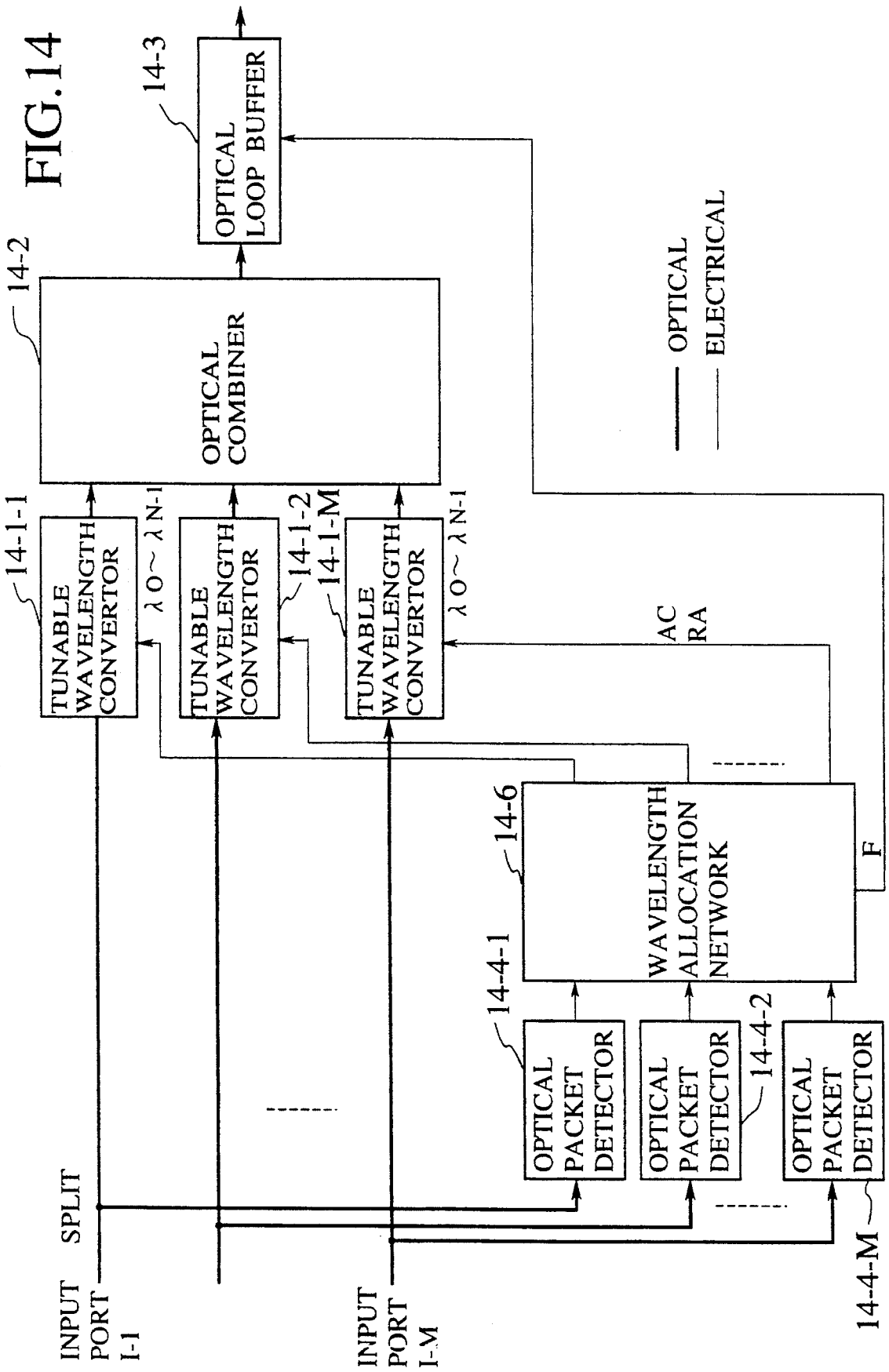
FIG. 14 is a block diagram of a modified photonic buffer memory configuration suitable for a frequency multiplexed output buffer used in the configuration of FIG. 3.

It is to be noted that the photonic buffer memory configuration of FIG. 13 can be modified into a modified configuration shown in FIG. 14, which comprises: M pieces of tunable wavelength convertors 14-1-1 to 14-1-M connected with M pieces of input ports I-1 to I-M on its input side; an optical combiner 14-2 connected with the tunable wavelength convertors 14-1-1 to 14-1-M on its input side: an optical loop buffer 14-3 connected with the optical combiner 14-2 on its input side; M pieces of optical packet detectors 14-4-1 to 14-4-M connected with the input ports I-1 to I-M; and a wavelength allocation network 14-6 connected with the optical packet detectors 14-4-1 to 14-4-M on its input side, and with each the tunable wavelength converter 14-1-1 to 14-1-M and the optical loop buffer 14-3 on its output side.

In other words, in this modified configuration of FIG. 14, the optical routing network 13-1 and the self-routing control network 13-7 in the configuration of FIG. 13 are omitted while the fixed wavelength convertors 13-2-1 to 13-2-N in the configuration of FIG. 13 is replaced by the tunable wavelength convertors 14-1-1 to 14-1-M which are directly connected with the input ports I-1 to I-M and directly controlled by the control packets from the wavelength allocation network 14-6. In addition, the optical multiplexer 13-3 in the configuration of FIG. 13 is replaced by the optical combiner 14-2 as the wavelengths of the output optical signals of the tunable wavelength convertors 14-1-1 to 14-1-M are tunable.

When the input optical packets arrive from the input ports I-1 to I-M, each of the tunable wavelength convertors 14-1-1 and 14-1-M is controlled to pass or block the entering optical packet by the control signal (AC, RA) from the wavelength allocation network 14-6 so as to control the output wavelength, and to carry out an appropriate wavelength conversion to make an appropriate wavelength allocation.

Figure 20:
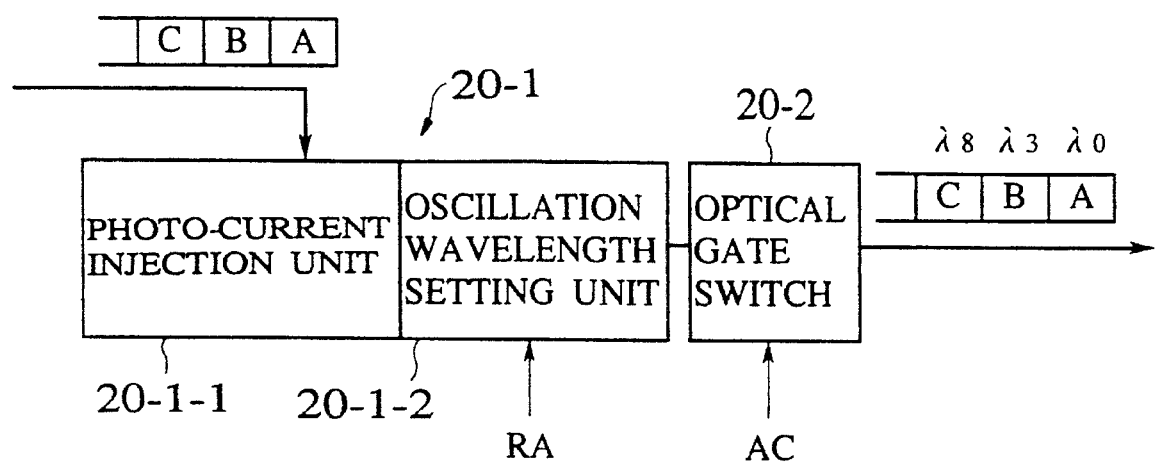
FIG. 20 is a block diagram of a tunable wavelength convertor used in the configuration of FIG. 13.

In this case, each of the tunable wavelength convertors 14-1-1 to 14-1-M has an exemplary configuration as shown in FIG. 20, which comprises: a tunable wavelength semiconductor laser 20-1 having a photo-current injection unit 20-1-1 at which the modulation is made directly by the optical signal power of the input optical packet entered into the photo-current injection unit 20-1-1, and an oscillation wavelength setting unit 20-1-2 connected with the photo-current injection unit 20-1-1 which changes the oscillation wavelength setting of the tunable wavelength semiconductor laser 20-1 at each timeslot according to the RA field of the control signal so as to make the oscillation at the predetermined wavelength at each timeslot; and an optical gate switch 20-2 for selectively passing or blocking the optical packet according to the AC field of the control signal.

In this modified configuration of FIG. 14, the optical packet detectors 14-4-1 t 14-4-M, the wavelength allocation network 14-6, and the optical loop buffer 14-3 are substantially equivalent to the corresponding elements in the configuration of FIG. 13 as described above.

Thus, this modified configuration of FIG. 14 has an advantage of realizing a compact photonic buffer memory configuration compared with the configuration of FIG. 13.

It is also possible to adapt the configuration of FIG. 13 or FIG. 14 to multi-input multi-output configuration in an obvious manner.

It is further to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. A photonic frequency routing type time division highway switch for switching optical signals on a plurality of time division input highways to output highways at each time slot, comprising:

a plurality of tunable frequency convertor means for assigning frequency channels to the optical signals on the input highways at each time slot, each tunable frequency convertor means on each input highway assigns mutually different frequency channels to the optical signals on each input highway which are destined to different output highways and different ones of the plurality of tunable frequency convertor means assign mutually different frequency channels to the optical signals on different input highways which are destined to an identical output highway;

frequency router means for connecting the optical signals outputted from the frequency convertor means to its outputs according to the frequency channels assigned to the optical signals at each time slot; and a plurality of frequency multiplexed output buffer means for outputting the optical signals outputted from the frequency router means to the output highways such that a plurality of optical signs with different frequency channels which are in an identical time slot are outputted at different time slots.

2. The photonic frequency routing type time division highway switch of claim 1, wherein the frequency router means includes:

a plurality of input lines for entering the optical signals;

a plurality of demultiplexers connected with the input lines for demultiplexing the optical signals from the input lines;

a plurality of output lines for outputting the optical signals;

a plurality of multiplexers connected with the output lines for multiplexing the optical signals from the demultiplexers; and a plurality of internal links for cross-connecting the demultiplexers and the multiplexers.

3. The photonic frequency routing type time division highway switch of claim 1, wherein the frequency router means is an arrayed waveguide grating filter including:

a plurality of input optical waveguides for entering the optical signals;

a first slab shaped optical waveguide for receiving the optical signals from the input optical waveguides;

an arrayed waveguide grating formed by a plurality of channel waveguides having mutually different lengths, for receiving the optical signals from the first slab shaped optical waveguide;

a second slab shaped optical waveguide for receiving the optical signals from the arrayed waveguide grating; and a plurality of output optical waveguides for outputting the optical signals from the second slab shaped optical waveguide.

4. The photonic frequency routing type time division highway switch of claim 1, wherein the frequency router means includes:

a plurality of frequency routers; and a plurality of internal links cross-connecting the frequency routers in multi-stages.

5. The photonic frequency routing type time division highway switch of claim 1, wherein the frequency router means having M inputs and M outputs connects each optical signal with a frequency channel $f_i$ from its j-th input to its k-th output such that $i=(j+k)$ modulo M where M is an integer.

6. The photonic frequency routing type time division highway switch of claim 1, wherein each of the frequency multiplexed output buffer means is a photonic buffer memory for storing optical signals randomly arriving from a plurality of input ports and outputting one of stored optical signals to an output port, including:

an optical routing network for routing the optical signals from the input ports to different output lines according to orders of arrivals of the optical signals periodically;

a plurality of fixed wavelength convertor means connected with the output lines of the optical routing network, for converting wavelengths of the optical signals outputted from respective output lines of the optical routing network to respectively prescribed new wavelengths;

an optical multiplexer for wavelength multiplexing the optical signals outputted from the fixed wavelength converter means;

an optical loop buffer for buffering the wavelength multiplexed optical signals outputted from the optical multiplexer;

a plurality of optical signal detectors for detecting optical signals from the input ports and generating electrical signals indicating a presence/absence of an optical signal from each input port;

a wavelength allocation network for generating control signals indicating the output lines of the optical routing network to which the optical signals from the input ports are to be routed according to the electrical signals generated by the optical signal detectors; and a self-routing control network for specifying optical signal paths in the optical routing network according to the control signals generated by the wavelength allocation network.

7. The photonic frequency routing type time division highway switch of claim 1, wherein each of the frequency multiplexed output buffer means is a photonic buffer memory for storing optical signals randomly arriving from a plurality of input ports and outputting one of stored optical signals to an output port, including:

a plurality of tunable wavelength convertor means connected with the input ports, for converting wavelengths of the optical signals entered from the respective input ports to new wavelengths according to orders of arrivals of the optical signals periodically;

an optical combiner for combining the optical signals outputted from the tunable wavelength converter means to obtain wavelength multiplexed optical signals;

an optical loop buffer for buffering the wavelength multiplexed optical signals outputted from the optical combiner;

a plurality of optical signal detectors for detecting optical signals from the input ports and generating electrical signals indicating a presence/absence of an optical signal from each input port;

a wavelength allocation network for generating control signals for controlling the tunable wavelength convertor means by indicating the new wavelengths to which the wavelengths of the optical signals from the input ports are to be converted according to the electrical signals generated by the optical signal detectors. convertor means assign mutually different frequency channels to the optical signals on different input highways which are destined to an identical output highway;

frequency router means for connecting the optical signals outputted from the frequency convertor means to its outputs according to the frequency channels assigned to the optical signals at each time slot; and a plurality of frequency multiplexed output buffer means for outputting the optical signals outputted from the frequency router means to the output highways such that a plurality of optical signs with different frequency channels which are in an identical time slot are outputted at different time slots.

8. A photonic frequency routing type time division highway switch for switching optical signs on a plurality of time division input highways to output highways at each time slot, comprising:

a plurality of photonic frequency outing type time division highway switch modules, each module including:

a plurality of tunable frequency convertor means for assigning frequency channels to the optical signs on its inputs at each time slot, each tunable frequency convertor means on each input highway assigns mutually different frequency channels to the optical signs on each input highway which are destined to different output highways and different ones of the plurality of tunable frequency convertor means assign mutually different frequency channels to the optical signals on different input highways which are destined to an identical output highway:

a frequency router for connecting the optical signals outputted from the frequency convertor means to its outputs according to the frequency channels assigned to the optical signs at each time slot; and a plurality of frequency multiplexed output buffer means for outputting the optical signals outputted from the frequency router to the output highways such that a plurality of optical signs with different frequency channels which are in an identical time slot are outputted at different time slots; and a plurality of internal links for cross-connecting the photonic frequency routing type time division highway switch modules in multi-stages.

9. A photonic frequency routing type time division highway switch for switching optical signals on a plurality of time division input highways to output highways at each time slot, comprising:

a first stage photonic frequency routing type time division highway switch module, including:

a plurality of first stage tunable frequency convertor means for assigning frequency channels to the optical signals on the input highways at each time slot, each tunable frequency convertor means on each input highway assigns mutually different frequency channels to the optical signals on each input highway which are destined to different output highways and different ones of the plurality of tunable frequency convertor means assign mutually different frequency channels to the optical signals on different input highways which are destined to an identical output highway; and a first stage frequency router for connecting the optical signals outputted from the first stage frequency convertor means to its outputs according to the frequency channels assigned to the optical signals at each time slot;

a last stage photonic frequency routing type time division highway switch module, including:

a plurality of last stage frequency switch means for selectively switching the frequency channels of the optical signals on its inputs at each time slot; and a last stage frequency router for connecting the optical signals outputted from the last stage frequency switch means to its outputs according to the frequency channels assigned to the optical signals at each time slot; and a plurality of last stage frequency multiplexed output buffer means for outputting the optical signals outputted from the last stage frequency router to the output highways such that a plurality of optical signals with different frequency channels which are in an identical time slot are outputted at different time slots;

a plurality of intermediate stage photonic frequency routing type time division highway switch modules, each module including:

a plurality of intermediate stage frequency switch means for selectively switching the frequency channels of the optical signs on its inputs at each time slot; and an intermediate stage frequency router for connecting the optical signals outputted from the intermediate stage frequency switch means to its outputs according to the frequency channels assigned to the optical signals at each time slot; and a plurality of frequency multiplexed internal links for cross-connecting the first, last, and intermediate stage photonic frequency routing type time division highway switch modules in multi-stages.

10. The photonic frequency routing type time division highway switch of claim 9, wherein each of the last and intermediate stage frequency switch means includes:

a splitter for distributing the optical signals on its inputs;

a plurality of frequency selector means for selecting the optical signals from the splitter;

a plurality of tunable frequency convertor means connected with the frequency selector means for assigning frequency channels to the optical signals on its inputs at each time slot; and a combiner for combining the optical signals from the frequency convertor means.

* * * * *